US008676277B2

(12) United States Patent
Takayama

(10) Patent No.: US 8,676,277 B2
(45) Date of Patent: *Mar. 18, 2014

(54) COMMUNICATION DEVICE, COMMUNICATION METHOD, PROGRAM AND COMMUNICATION SYSTEM

(71) Applicant: Sony Corporation, Tokyo (JP)

(72) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,803

(22) Filed: Feb. 6, 2013

(65) Prior Publication Data

US 2013/0150135 A1 Jun. 13, 2013

Related U.S. Application Data

(63) Continuation of application No. 12/625,101, filed on Nov. 24, 2009, now Pat. No. 8,401,596.

(30) Foreign Application Priority Data

Nov. 27, 2008 (JP) ................................. 2008-302484

(51) Int. Cl.
*H04B 1/38* (2006.01)
(52) U.S. Cl.
USPC ......... 455/574; 455/522; 455/127.5; 370/296
(58) Field of Classification Search
USPC ............ 455/574, 522, 127.5, 231, 41.2, 41.1; 370/296, 350
See application file for complete search history.

(56) References Cited

U.S. PATENT DOCUMENTS

| 5,924,042 | A  | * | 7/1999 | Sakamoto et al. | 455/458 |
| 6,018,690 | A  | * | 1/2000 | Saito et al. | 700/295 |
| 6,424,820 | B1 | * | 7/2002 | Burdick et al. | 455/41.1 |
| 6,594,493 | B1 | * | 7/2003 | Davies et al. | 455/436 |

(Continued)

FOREIGN PATENT DOCUMENTS

| EP | 1653632 | 5/2006 |
| EP | 1845632 | 10/2007 |

(Continued)

OTHER PUBLICATIONS

European Patent Office, European Search Report, issued in connection with European Patent Application Serial No. 09014229.0, dated Nov. 28, 2011. (4 pages).

(Continued)

*Primary Examiner* — Minh D Dao
(74) *Attorney, Agent, or Firm* — K&L Gates LLP

(57) ABSTRACT

A communication device is provided and includes: an electromagnetic-wave generating means for outputting an electromagnetic wave; and a transmitting/receiving means for transmitting data by modulating the electromagnetic wave in accordance with data as well as receiving data transmitted from the other device by demodulating the electromagnetic wave outputted by the electromagnetic-wave generating means or the electromagnetic wave outputted by the other device as the other party of communication, wherein the transmitting/receiving means transmits attribute information indicating communication ability of the device itself as well as receives attribute information indicating communication ability of the other device as the data, and the electromagnetic-wave generating means turns off the output of the electromagnetic wave for a given period of time after the transmission of the data based on the attribute information.

9 Claims, 24 Drawing Sheets

(56) References Cited

U.S. PATENT DOCUMENTS

| | | | |
|---|---|---|---|
| 6,950,677 B2* | 9/2005 | Lo et al. | 455/557 |
| 7,209,706 B2* | 4/2007 | Fujii et al. | 455/41.2 |
| 7,231,530 B1* | 6/2007 | Miller et al. | 713/320 |
| 7,346,061 B2* | 3/2008 | Takayama et al. | 370/395.4 |
| 7,738,494 B2* | 6/2010 | Takayama | 370/475 |
| 7,831,282 B2* | 11/2010 | Luebke et al. | 455/574 |
| 7,869,823 B2* | 1/2011 | Nassimi | 455/550.1 |
| 7,948,362 B2* | 5/2011 | Bungartz et al. | 340/10.33 |
| 7,984,651 B2* | 7/2011 | Randall et al. | 73/661 |
| 8,079,263 B2* | 12/2011 | Randall et al. | 73/602 |
| 8,085,745 B2* | 12/2011 | Park et al. | 370/338 |
| 8,111,144 B2* | 2/2012 | Kirkup et al. | 340/13.26 |
| 8,166,822 B1* | 5/2012 | Urbano et al. | 73/602 |
| 2004/0116074 A1* | 6/2004 | Fujii et al. | 455/41.2 |
| 2008/0070614 A1 | 3/2008 | Minoru et al. | |
| 2008/0076572 A1* | 3/2008 | Nguyen et al. | 463/42 |
| 2008/0291852 A1* | 11/2008 | Abel | 370/296 |
| 2009/0247164 A1* | 10/2009 | Kandukuri Narayan et al. | 455/436 |
| 2011/0070828 A1* | 3/2011 | Griffin et al. | 455/41.1 |
| 2011/0199192 A1* | 8/2011 | Buckner | 340/10.51 |
| 2011/0212687 A1* | 9/2011 | Foster | 455/41.1 |
| 2012/0109399 A1* | 5/2012 | Tran | 700/296 |

FOREIGN PATENT DOCUMENTS

| | | |
|---|---|---|
| GB | 2443234 | 4/2008 |
| JP | 11-126240 | 5/1999 |
| JP | 11-196022 | 7/1999 |
| JP | 11-196023 | 7/1999 |
| JP | 11-338984 | 12/1999 |
| JP | 2004-252928 | 9/2004 |
| JP | 2006-157593 | 6/2006 |
| JP | 2007-043269 | 2/2007 |
| JP | 2007-208586 | 8/2007 |
| JP | 2008-010011 | 1/2008 |
| JP | 2008-533604 | 8/2008 |
| WO | 2008/065232 | 6/2008 |

OTHER PUBLICATIONS

Japanese Office Action issued Dec. 16, 2010 related to corresponding Japanese Appln. No. 2008-302484.

Japanese Office Action issued Sep. 28, 2010 related to corresponding Japanese Appln. No. 2008-302484.

Japanese Patent Office, Notice of Reasons for Refusal issued in connection with Japanese Patent Application Serial No. 2011-028533, dated Nov. 29, 2012. (3 pages).

* cited by examiner

COMMUNICATION SYSTEM

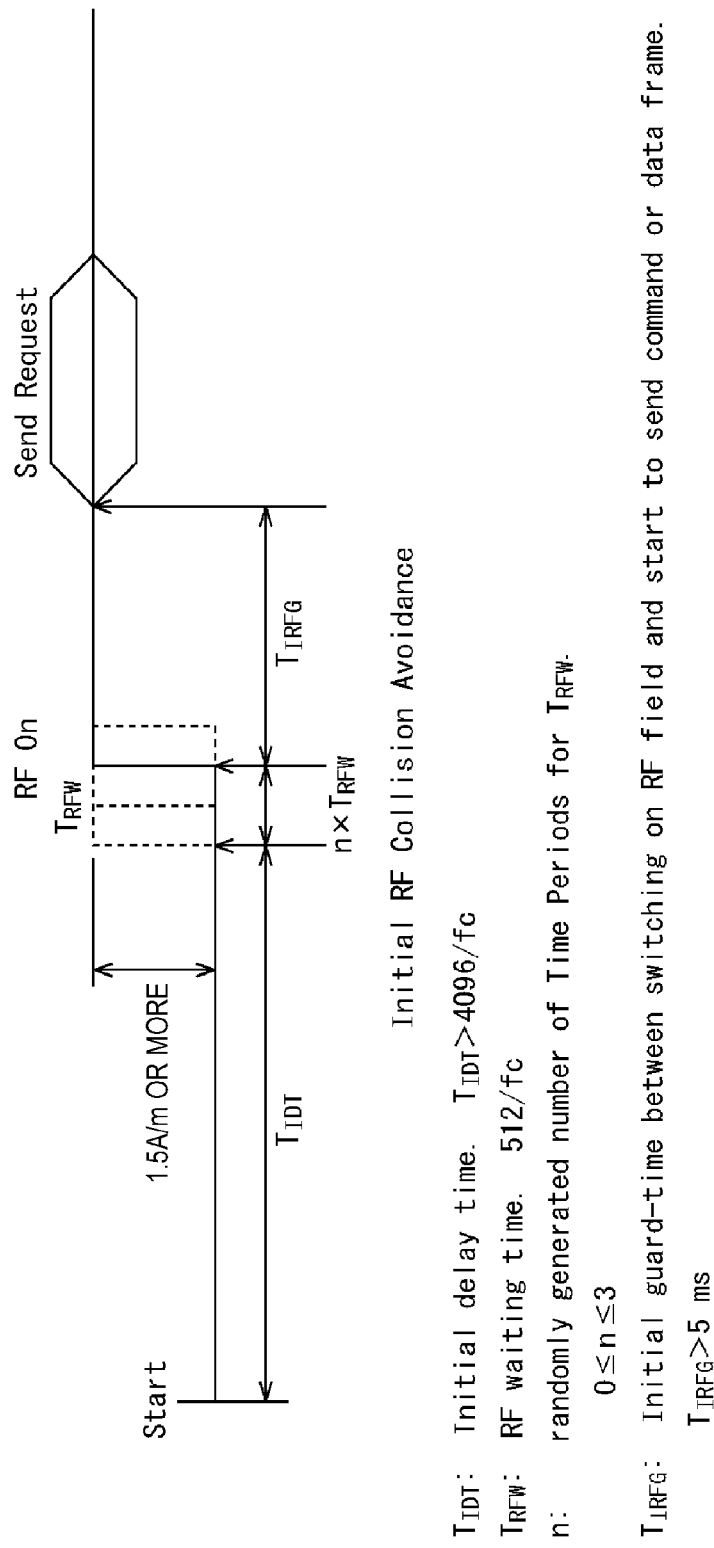

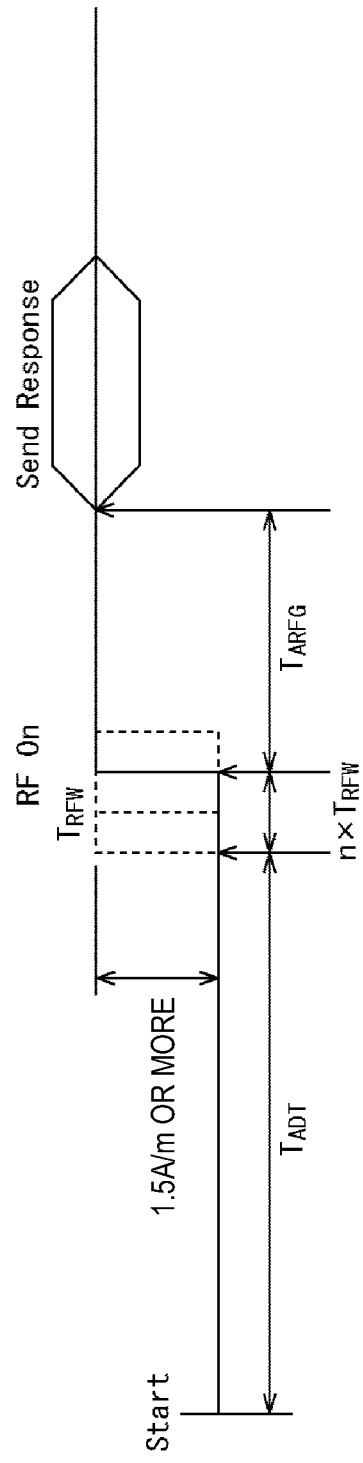

FIG.6

Response RF Collision Avoidance sequence during activation $T_{ADT}$: Active delay time, sense time between RF off Initiator/Target and Target/Initiator. ($768/fc \leq T_{ADT} \leq 2559/fc$)
$T_{RFW}$: RF waiting time. ($512/fc$)
n: Randomly generated number of Time Periods for $T_{RFW}$. ($0 \leq n \leq 3$)
$T_{ARFG}$: Active guard time between switching on RF field and start to send command. ($T_{ARFG} > 1024/fc$)

FIG.7

| NAME | INSTRUCTION BYTE | | DEFINITION |
|---|---|---|---|
| | CMD 0 | CMD 1 | |
| ATR_REQ | (D4) | (00) | Attribute Request (TRANSMITTED BY INITIATOR) |
| ATR_RES | (D5) | (01) | Attribute Response (TRANSMITTED BY TARGET) |
| WUP_REQ | (D4) | (02) | Wakeup Request (TRANSMITTED BY INITIATOR ONLY IN ACTIVE MODE) |
| WUP_RES | (D5) | (03) | Wakeup Response (TRANSMITTED BY THE TARGET ONLY IN ACTIVE MODE) |
| PSL_REQ | (D4) | (04) | Parameter selection Request (TRANSMITTED BY INITIATOR) |
| PSL_RES | (D5) | (05) | Parameter selection Response (TRANSMITTED BY TARGET) |
| DEP_REQ | (D4) | (06) | Data Exchange Protocol Request (TRANSMITTED BY INITIATOR) |
| DEP_RES | (D5) | (07) | Data Exchange Protocol Response (TRANSMITTED BY TARGET) |
| DSL_REQ | (D4) | (08) | Deselect Request (TRANSMITTED BY INITIATOR) |
| DSL_RES | (D5) | (09) | Deselect Response (TRANSMITTED BY TARGET) |
| RLS_REQ | (D4) | (0A) | Release Request (TRANSMITTED BY INITIATOR) |
| RLS_RES | (D5) | (0B) | Release Response (TRANSMITTED BY TARGET) |

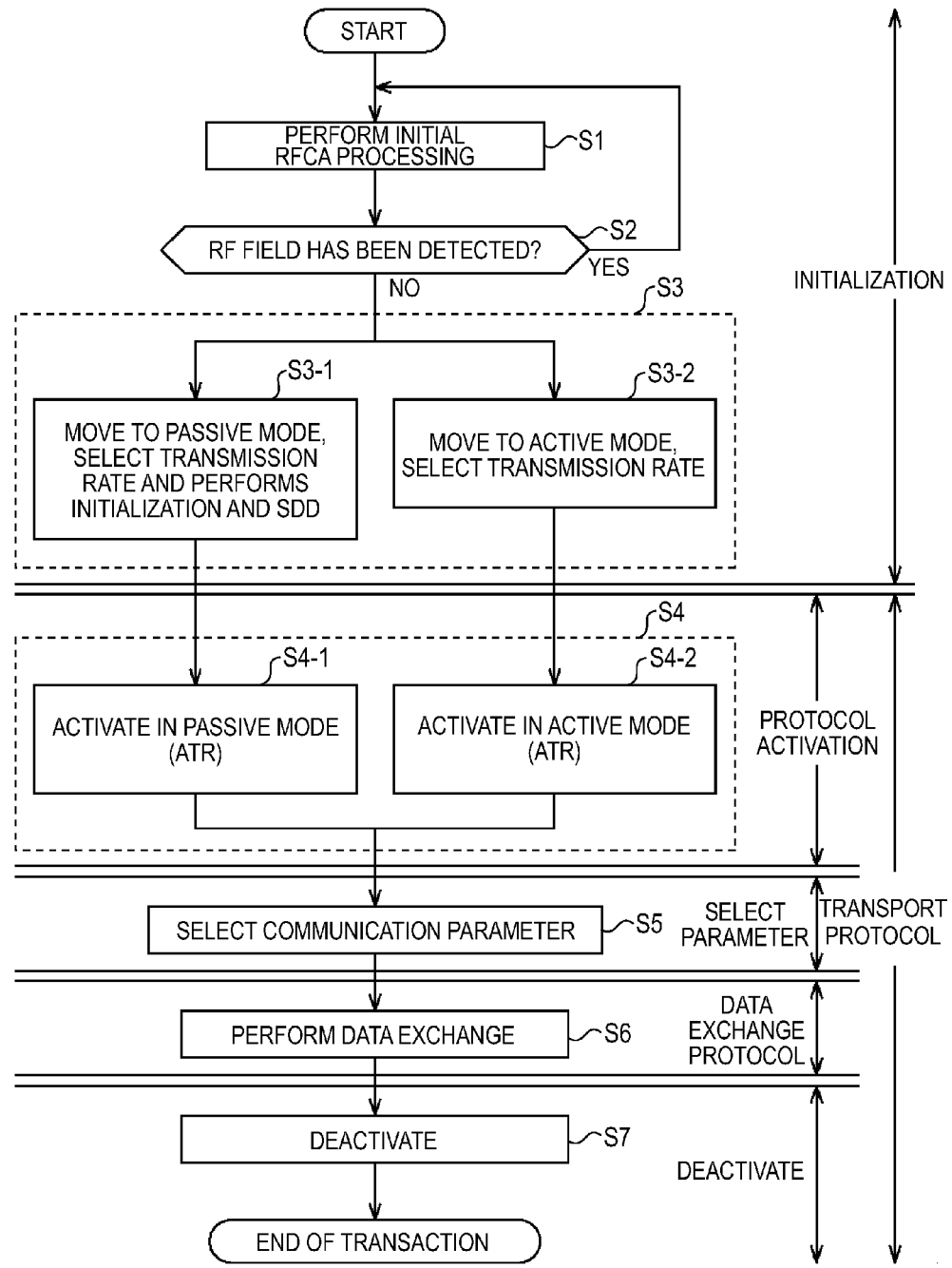

FIG.13

| NAME | INSTRUCTION BYTE | | DEFINITION |
|---|---|---|---|
| | CMD 0 | CMD 1 | |
| PSL2_REQ | (D4) | (0C) | Parameter selection Request2 (TRANSMITTED BY INITIATOR) |
| PSL2_RES | (D5) | (0D) | Parameter selection Response2 (TRANSMITTED BY TARGET) |

FIG.14

| CMD 0 | CMD 1 | Byte 0 | ... | Byte 9 | Byte 10 | Byte 11 | Byte 12 | Byte 13 | Byte 14 | ... | Byte n+14 |
|---|---|---|---|---|---|---|---|---|---|---|---|
| (D4) | (00) | nfcid3i 0 | ... | nfcid3i 9 | DIDi | BSi | BRi | PPi | [Gi[0]] | ... | [Gi[n]] |

ATR_REQ

| bit 7 | bit 6 | bit 5 | bit 4 | bit 3 | bit 2 | bit 1 | bit 0 |
|---|---|---|---|---|---|---|---|
| 0/1 | 0 | LRi | LRi | 0 | 0 | Gi | NAD |

PPi

FIG.16

| CMD 0 | CMD 1 | Byte 0 | ... | Byte 9 | Byte 10 | Byte 11 | Byte 12 | Byte 13 | Byte 14 | Byte 15 | ... | Byte n+15 |
|---|---|---|---|---|---|---|---|---|---|---|---|---|
| (D5) | (01) | nfcid3t0 | ... | nfcid3t9 | DIDt | BSt | BRt | T0 | PPt | [Gt[0]] | ... | [Gt[n]] |

ATR_RES

| bit 7 | bit 6 | bit 5 | bit 4 | bit 3 | bit 2 | bit 1 | bit 0 |
|---|---|---|---|---|---|---|---|
| 0/1 | 0 | LRt | LRt | 0 | 0 | Gt | NAD |

PPt

FIG.18

| CMD 0 | CMD 1 | Byte 0 | Byte 1 | Byte 2 | Byte 3 | Byte 4 | Byte 5 | Byte 6 | Byte 7 |
|---|---|---|---|---|---|---|---|---|---|
| (D4) | (0C) | FLAG | LP | RFU | RFU | ON time period | | OFF time period | |

↙ PSL2_REQ

FIG.19

| bit 7 | bit 6 | bit 5 | bit 4 | bit 3 | bit 2 | bit 1 | bit 0 |
|---|---|---|---|---|---|---|---|
| LP valid | ON valid | OFF valid | GO Passive | RFU | RFU | RFU | RFU |

FLAG

| CMD 0 | CMD 1 | Byte 0 | Byte 1 | Byte 2 | Byte 3 | Byte 4 | Byte 5 | Byte 6 | Byte 7 |
|---|---|---|---|---|---|---|---|---|---|
| (D5) | (0D) | MSG | RFU | RFU | RFU | RFU | RFU | RFU | RFU |

PSL2_RES

FIG.21

| bit 7 | bit 6 | bit 5 | bit 4 | bit 3 | bit 2 | bit 1 | bit 0 |
|---|---|---|---|---|---|---|---|
| LP ok | OFF ok | Passive ok | RFU | RFU | RFU | RFU | RFU |

MSG

COMMUNICATION DEVICE, COMMUNICATION METHOD, PROGRAM AND COMMUNICATION SYSTEM

CROSS REFERENCES TO RELATED APPLICATIONS

The present application is a continuation of U.S. patent application Ser. No. 12/625,101 filed on Nov. 24, 2009, which claims priority to Japanese Priority Patent Application JP 2008-302484 filed in the Japan Patent Office on Nov. 27, 2008, the entire content of which is hereby incorporated by reference.

BACKGROUND

The present disclosure relates to a communication device, a communication method, a program and a communication system, and particularly relates to a communication device, a communication method, a program and a communication system capable of reducing power consumption.

A near-field wireless communication system performing contactless wireless communication in a near field by using an IC (Integrated Circuit) card is widely used. For example, applications as an electronic ticket and electronic money are well known. Recently, a cell phone including functions of the electronic ticket and the electronic money is becoming popular.

In the near-field wireless communication system, there exist a proximity-type IC card system prescribed as ISO/IEC 14443, a vicinity-type IC card system prescribed as ISO/IEC 15693, a NFC (Near Field Communication) prescribed as ISO/IEC 18092 and the like. ISO/IEC 18092 is a standard of NFCIP (Near Field Communication Interface and Protocol)-1.

There are an active mode and a passive mode in the near-field wireless communication by ISO/IEC 18092. The active mode is a communication mode in which electromagnetic waves are outputted in plural communication devices which transmit and receive data, and data is transmitted by modulating the electromagnetic waves. In the passive mode, one communication device (initiator) in the plural communication devices outputs an electromagnetic wave and data is transmitted by modulating the electromagnetic wave. Another communication device (target) in the plural communication devices transmits data by performing load modulation of the electromagnetic wave outputted by the initiator.

A "PCD" (Proximity Coupling Device) which is a reader/writer of ISO/IEC 14443, a "VCD" (Vicinity Coupling Device) which is a reader/writer of ISO/IEC 15693 and an initiator in the passive mode of ISO/IEC 18092 form a so-called RF (Radio Frequency) field (magnetic field) by generating the electromagnetic wave. An IC card of ISO/IEC 14443 (PICC), an IC card of ISO/IEC 15693 (VICC) and the target of ISO/IEC 18092 receives power supply by electromagnetic induction when coming close to the reader/writer or the initiator and can perform data transmission with respect to the reader/writer or the initiator.

Accordingly, it is necessary that the reader/writer of ISO/IEC 14443 and ISO/IEC 15693 and the initiator of ISO/IEC 18092 continue generating the electromagnetic wave for a long period of time with the main aim of supplying power to the IC card or the target. Therefore, there is a problem that power consumption of the reader/writer and the initiator is increased. For example, when the cell phone having functions of the reader/writer or the initiator performs output of the electromagnetic wave as described above, operable time which is 200 hours to 600 hours in just a normal stand-by state will be reduced to less than $\frac{1}{10}$.

Various studies concerning techniques for reducing power consumption have been made until now (for example, JP-T-2008-533604, JP-A-11-126240 and JP-A-11-338984 (Patent Documents 1 to 3)).

However, particularly in the case that the near-field wireless communication function is included in a buttery-driven electronic apparatus such as the cell phone, a request for power saving is still great, and further reduction of power consumption is desired. Thus, it is desirable to reduce power consumption.

SUMMARY

According to an embodiment, there is provided a communication device including an electromagnetic-wave generating means for outputting an electromagnetic wave and a transmitting/receiving means for transmitting data by modulating the electromagnetic wave in accordance with data as well as receiving data transmitted from the other device by demodulating the electromagnetic wave outputted by the electromagnetic-wave generating means or the electromagnetic wave outputted by the other device as the other party of communication, in which the transmitting/receiving means transmits attribute information indicating communication ability of the device itself as well as receives attribute information indicating communication ability of the other device as data, and the electromagnetic-wave generating means turns off the output of the electromagnetic wave for a given period of time after the transmission of the data based on the attribute information.

In an active mode in which data is transmitted by modulating the electromagnetic wave in accordance with data as well as data transmitted from the other device is received by demodulating the electromagnetic wave outputted by the other device, the electromagnetic-wave generating means can turn off output of the electromagnetic wave for a given period of time shorter than an initial delay time which is the minimum time for which a device which intends to start transmission/reception of data have to check that the electromagnetic wave is not output.

In the active mode in which data is transmitted by modulating the electromagnetic wave in accordance with data as well as data transmitted from the other device is received by demodulating the electromagnetic wave outputted by the other device, the attribute information transmitted and received by the transmitting/receiving means includes information concerning the given period of time for which output of the electromagnetic wave is turned off, and the electromagnetic-wave generating means can turn off output of the electromagnetic wave for the given time determined by the attribute information.

When the given period of time is longer than the initial delay time which is the minimum time for which a device which intends to start transmission/reception of data have to check that the electromagnetic wave is not output, it is possible that the communication device does not respond to output of the electromagnetic wave from another device which intends to start transmission/reception of data until the communication mode in which output of the electromagnetic wave is turned off during the given period of time is released.

According to another embodiment, there is provided a communication method in a communication device including an electromagnetic-wave generating means for outputting an electromagnetic wave and a transmitting/receiving means for transmitting data by modulating the electromagnetic wave in accordance with data as well as receiving data transmitted from the other device by demodulating the electromagnetic wave outputted by the electromagnetic-wave generating means or the electromagnetic wave outputted by the other device as the other party of communication, which includes the steps of transmitting attribute information indicating communication ability of the device itself as well as receiving attribute information indicating communication ability of the other device as data by the transmitting/receiving means and turning off output of the electromagnetic wave for a given period of time after transmission of the data based on the attribute information by the electromagnetic-wave generating means.

According to still another embodiment, there is provided a program allowing a computer to execute processing of transmitting attribute information indicating communication ability of the device itself as well as receiving attribute information indicating communication ability of the other device as data by the transmitting/receiving means for transmitting data by modulating the electromagnetic wave in accordance with data as well as receiving data transmitted from the other device by demodulating the electromagnetic wave outputted by the electromagnetic-wave generating means or the electromagnetic wave outputted by the other device as the other party of communication, and turning off output of the electromagnetic wave for a given period of time after transmission of the data based on the attribute information by the electromagnetic-wave generating means.

According to the embodiments, attribute information indicating communication ability of the device itself is transmitted as well as attribute information indicating communication ability of the other device is received as data, and output of the electromagnetic wave is turned off for a given period of time after the transmission of the data based on the received attribute information.

According to yet another embodiment, there is provided a communication system including a first communication device and a second communication device which is the other party of communication, in which the first communication device has an electromagnetic-wave generating means for outputting an electromagnetic wave and a first transmitting/receiving means for transmitting data by modulating the electromagnetic wave in accordance with data as well as receiving data transmitted from the second communication device by demodulating the electromagnetic wave outputted by the electromagnetic-wave generating means or the electromagnetic wave outputted by the second communication device, the first transmitting/receiving means transmits attribute information indicating communication ability of the first communication device as well as receives attribute information indicating communication ability of the second communication device as data, the electromagnetic-wave generating means turns off output of the electromagnetic wave for a given period of time after transmission of the data based on the attribute information, the second communication device has a second transmitting/receiving means for receiving data transmitted from the first communication device by demodulating the electromagnetic wave outputted by the first communication device as well as transmitting data by modulating the electromagnetic wave outputted by the first communication device or the electromagnetic wave outputted by the device for itself in accordance with the data, and the second transmitting/receiving means receives attribute information indicating communication ability of the first communication device as well as transmits attribute information indicating communication ability of the second communication device as data.

In the first communication device according to the embodiment, attribute information indicating communication ability of the first communication device is transmitted as well as attribute information indicating communication ability of the second communication device is received as data, and output of the electromagnetic wave is turned off for a given period of time after the transmission of the data based on the received attribute information. In the second communication device, attribute information indicating communication ability of the first communication device is received as well as attribute information indicating communication ability of the second communication device is transmitted as data.

The program can be provided by being transmitted through a transmission medium or provided by being recorded in a recording medium.

The communication device may be an independent device or may be an internal block included in one device.

According to the embodiments, it is possible to reduce power consumption.

Additional features and advantages are described herein, and will be apparent from the following Detailed Description and the figures.

BRIEF DESCRIPTION OF THE FIGURES

FIG. 5 is a timing chart explaining initial RFCA processing;

FIG. 6 is a timing chart explaining response RFCA processing;

FIG. 7 is a chart showing a command set prescribed in ISO/IEC 18092;

FIG. 8 is a flowchart explaining an outline of communication processing complying with NFCIP-1;

FIG. 13 is a chart showing an extended command set;

FIG. 14 is a chart showing a structure of a command ATR_REQ;

FIG. 16 is a chart showing a structure of a command ATR_RES;

FIG. 18 is a chart showing a structure of a command PSL2_REQ;

FIG. 19 is a chart showing a structure of a FLAG field;

FIG. 21 is a chart showing a structure of a MSG field;

DETAILED DESCRIPTION

Figure 1:
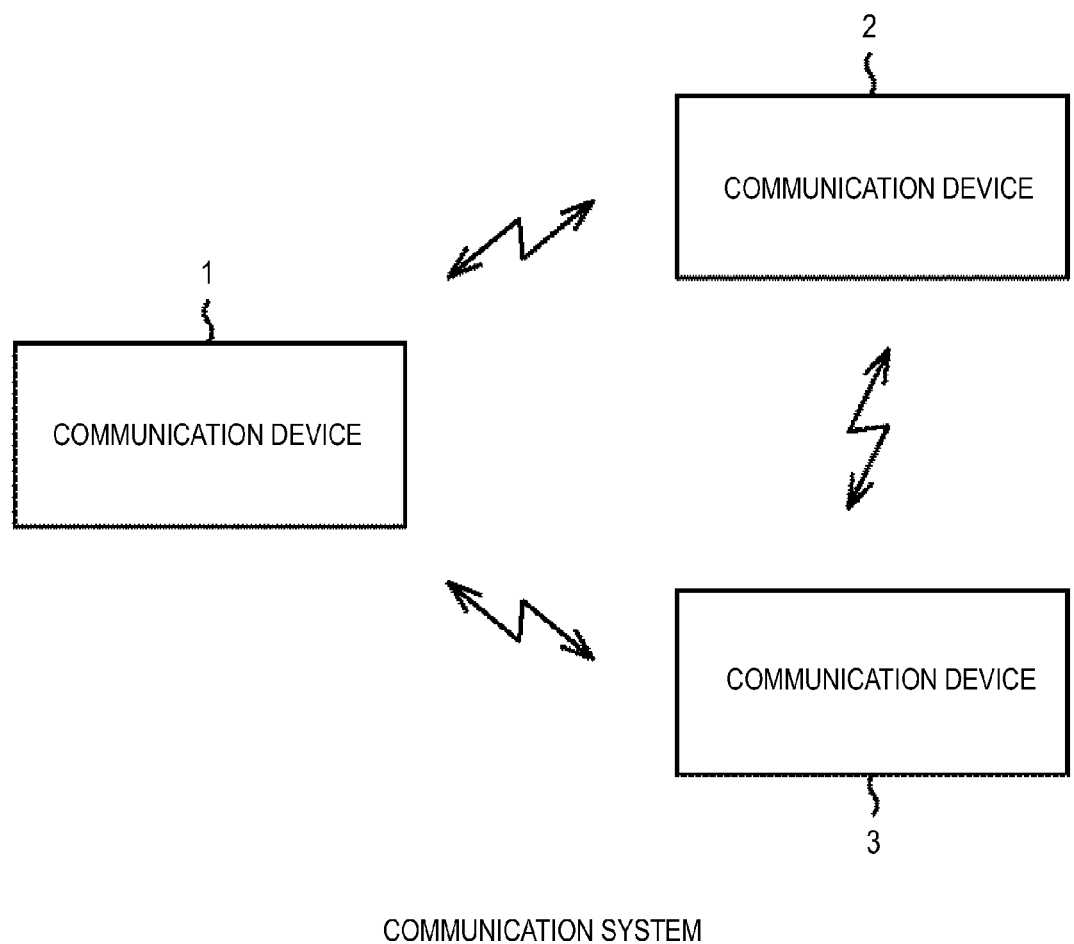
FIG. 1 is a block diagram showing a configuration example as an embodiment of a communication system.

FIG. 1 shows a configuration example as an embodiment of a communication system ("system" indicates plural devices which are logically coupled, and it does not matter whether the devices of respective configurations are included in the same casing or not).

In FIG. 1, the communication system includes three NFC communication devices 1, 2 and 3. Respective NFC communication devices 1 to 3 can perform near field communication (NFC) by electromagnetic induction using a carrier wave of a single frequency with another NFC communication device.

As the frequency of the carrier wave used by the NFC communication devices 1 to 3, for example, 13.56 MHz ISM (Industrial Scientific Medical) band can be applied.

The near field communication indicates communication which can be performed when the distance between devices performing communication come close within several ten centimeters, including communication performed in a state in which (casings of) devices performing communication are contact with each other.

The communication shown in FIG. 1 can be applied as an IC card system in which one or more of the NFC communication devices 1 to 3 may be a reader/writer and another one or more of them may be an IC card. That is, the NFC communication devices 1 to 3 are devices which perform near field communication, which are not limited to any of the IC card and the reader/writer in the IC card system, or communication devices complying with the NFC standard. It is also possible to apply the respective NFC communication devices 1 to 3 as communication systems of a PDA (Personal Digital Assistant), a PC (Personal Computer), a cell phone, a watch, a pen and the like.

[Explanation of a Passive Mode and an Active Mode]

The NFC communication devices 1 to 3 can perform communication in two communication modes which are a passive mode and an active mode. For example, note the communication between the NFC communication device 1 and the NFC communication device 2 in the NFC communication devices 1 to 3. In the passive mode, for example, the NFC communication device 1 which is one NFC communication device of the NFC communication device 1 and the NFC communication device 2 modulates an (carrier wave corresponding to) electromagnetic wave generated for itself to thereby transmit data to the NFC communication device 2 which is the other NFC communication device. The NFC communication device 2 performs load modulation of the (carrier wave corresponding to) electromagnetic wave generated by the NFC communication device 1 to thereby transmit data to the NFC communication device 1. This is the same as IC card systems of ISO/IEC 14443 and ISO/IEC 15693.

On the other hand, in the active mode, both the NFC communication device 1 and the NFC communication device 2 modulate the (carrier wave corresponding to) electromagnetic wave generated for themselves to thereby transmit data.

Here, when the near field communication by electromagnetic induction is performed, a device which starts communication by outputting the electromagnetic wave at first, that is, the device having the initiative is called an initiator. The near field communication is performed in a manner in which the initiator transmits a command to the other party of communication and the other party of communication makes a response to the command. The other party of communication which makes a response to a command from the initiator is called a target.

For example, assuming that the NFC communication device 1 starts output of the electromagnetic wave to start communication with the NFC communication device 2, the NFC communication device 1 becomes the initiator and the NFC communication device 2 becomes the target.

Figure 2:
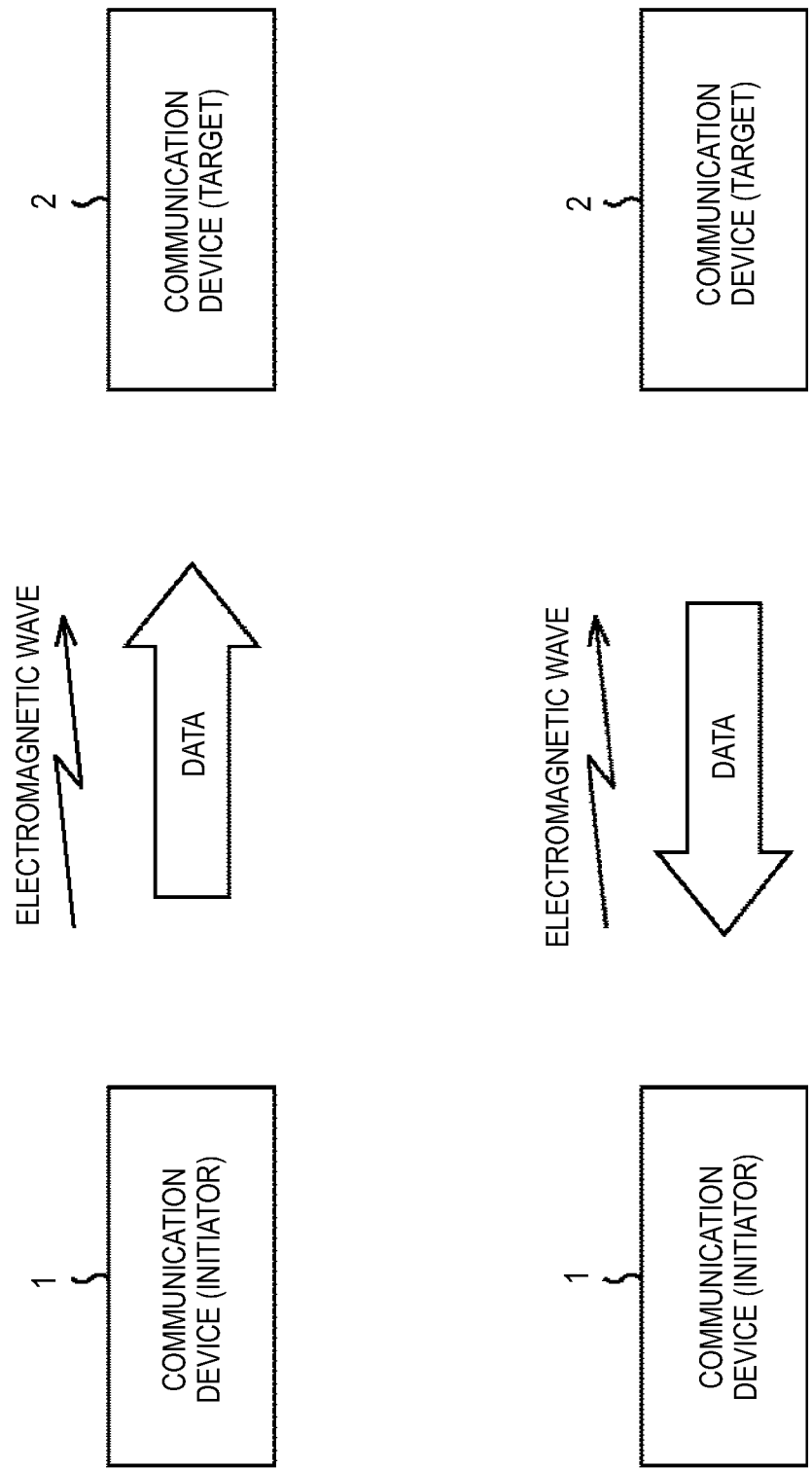
FIG. 2 is a diagram explaining a passive mode.

In the passive mode, the NFC communication device 1 which is the initiator continues outputting the electromagnetic wave and modulates the electromagnetic wave outputted for itself to thereby transmit data to the NFC communication device 2 which is the target as shown in FIG. 2. The NFC communication device 2 performs load modulation of the electromagnetic wave outputted by the NFC communication device 1 which is the initiator to thereby transmit data to the NFC communication device 1.

Figure 3:
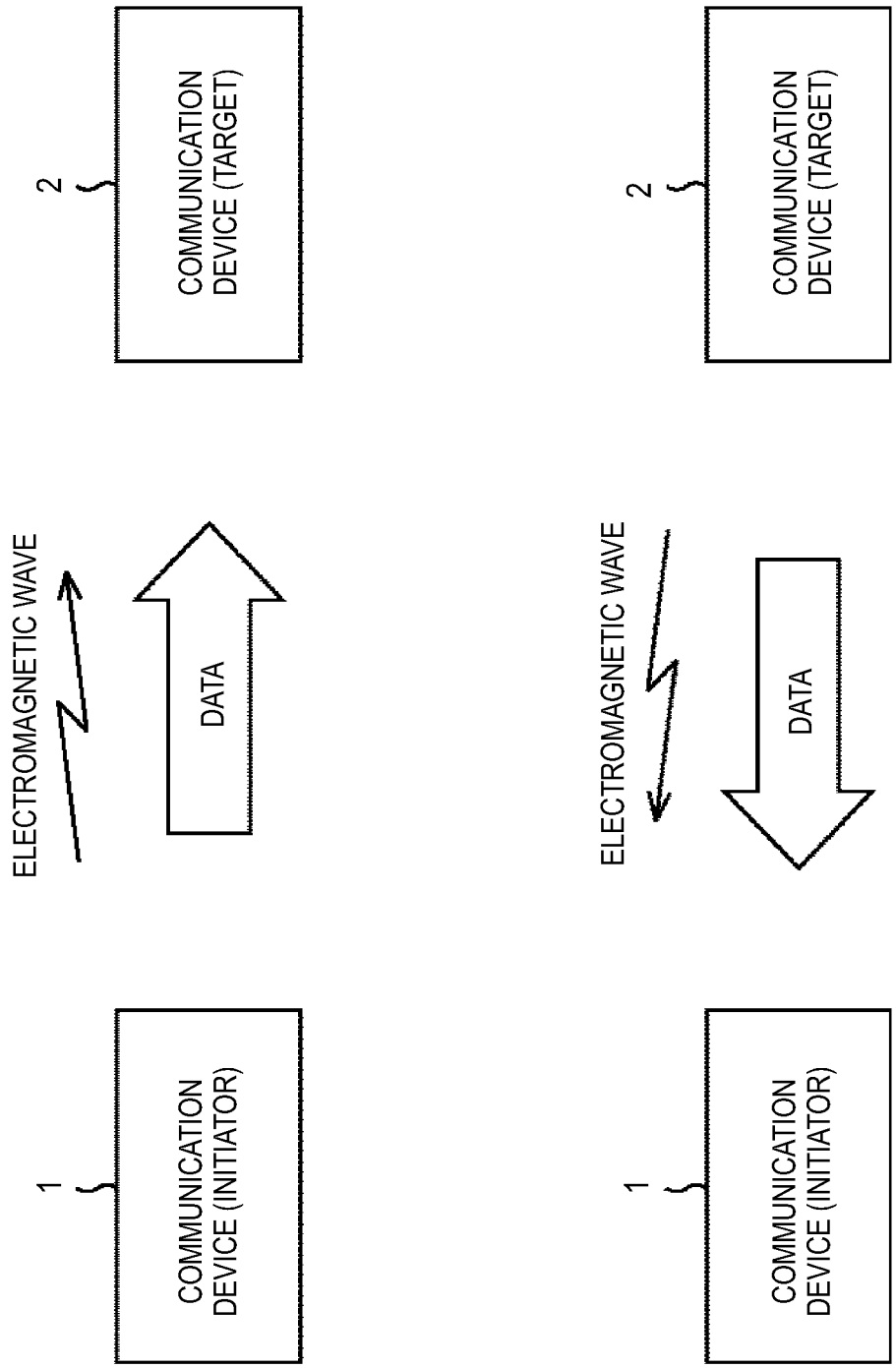
FIG. 3 is a diagram explaining an active mode.

On the other hand, in the active mode, when the NFC communication device 1 itself transmits data, the NFC communication device 1 which is the initiator starts output of the electromagnetic wave for itself and modulates the electromagnetic wave to thereby transmit data to the NFC communication device 2 which is the target as shown in FIG. 3. Then, the NFC communication device 1 stops output of the electromagnetic wave after data transmission is completed. The NFC communication device 2 also starts output of the electromagnetic wave for itself and modulates the electromagnetic wave to thereby transmit data to the NFC communication device 1 which is the target when the NFC communication device 2 itself transmits data. Then, the NFC communication device 2 stops output of the electromagnetic wave after data transmission is completed.

In FIG. 1, the communication system is configured by three NFC communication devices 1 to 3, however, the NFC communication devices included in the communication system are not limited to three, and two devices, or four or more devices may be included in the system. Moreover, the communication system can be configured by including, for example, the IC card, the reader/writer and the like configuring the IC card systems of ISO/IEC 14443 and the ISO/IEC 15693.

[Configuration Example of the NFC Communication Device 1]

Figure 4:
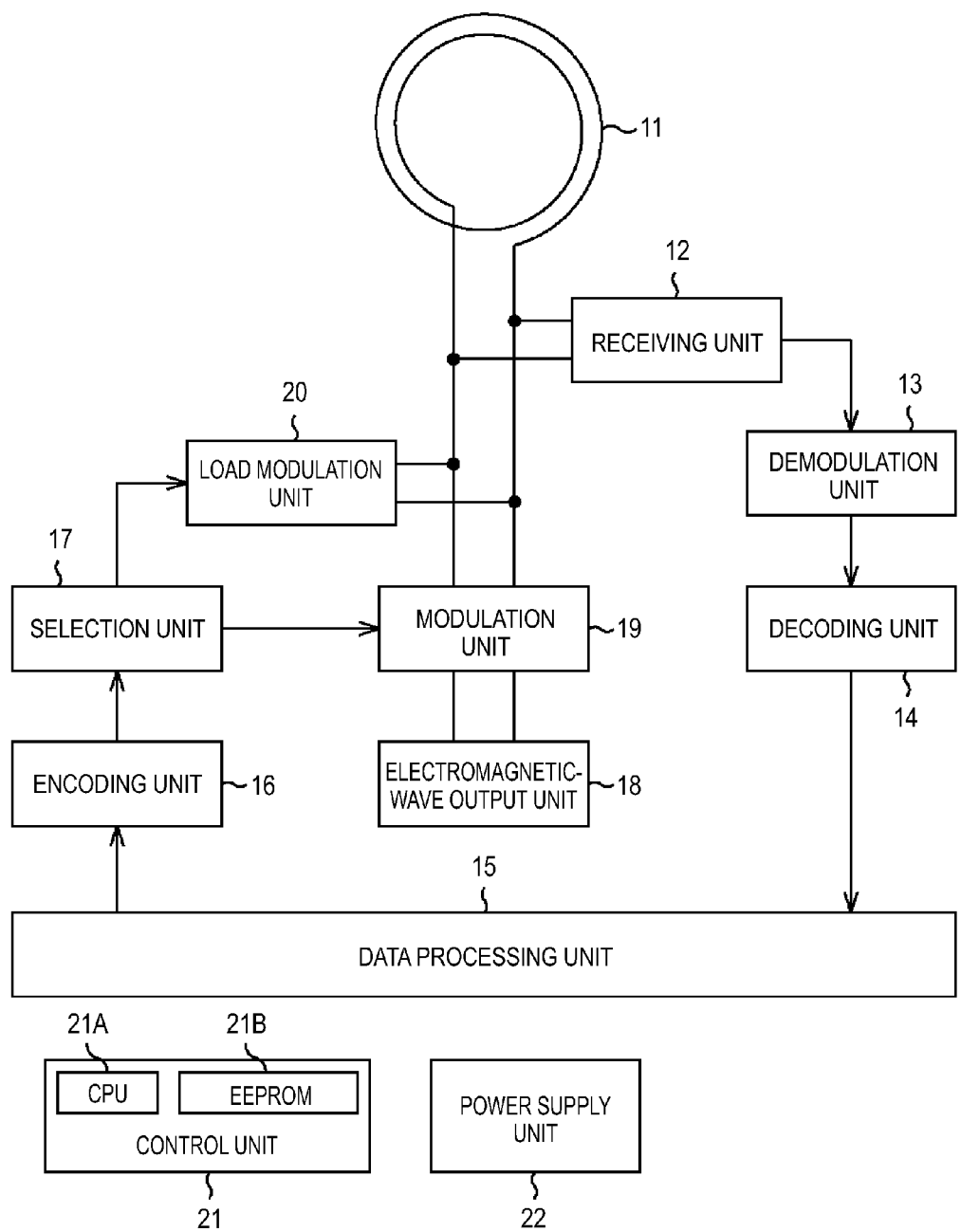
FIG. 4 is a block diagram showing a configuration example of an NFC communication device.

FIG. 4 shows a configuration example of the NFC communication device 1 of FIG. 1. Since other NFC communication device 2 and the NFC communication device 3 in FIG. 1 are also configured in the same manner as the NFC communication device 1 of FIG. 4, the explanations thereof are omitted.

An antenna 11 forms a closed loop coil, outputting the electromagnetic wave by electric current flowing in the coil being changed. Magnetic flux passing through the coil as the antenna 11 is changed, thereby allowing electric current to flow in the antenna 11.

A receiving unit 12 receives electric current flowing in the antenna 11 and outputs the current to a demodulation unit 13 after performing tuning and detection. The demodulation unit 13 demodulates a signal supplied from the receiving unit 12 and supplies the signal to a decoding unit 14. The decoding unit 14 decodes a signal, for example, a Manchester code, which is supplied from the demodulation unit 13, supplying data obtained as a result of the decoding to a data processing unit 15.

The data processing unit 15 performs given processing based on data supplied from the decoding unit 14. The data processing unit 15 supplies data to be transmitted to another device to the encoding unit 16.

The encoding unit 16 encodes data supplied from the data processing unit 15 into, for example, the Manchester code and supplies the data to a selection unit 17. The selection unit 17 selects one of a modulation unit 19 or a load modulation unit 20 and outputs the signal supplied from the encoding unit 16 to the selected unit.

Here, the selection unit 17 selects the modulation unit 19 or the load modulation unit 20 under the control of a control unit 21. When the communication mode is the passive mode and the NFC communication device 1 is the target, the control unit 21 allows the selection unit 17 to select the load modulation unit 20. When the communication mode is the active mode or when the communication mode is the passive mode as well as the NFC communication device 1 is the initiator, the control unit 21 allows the selection unit 17 to select the modulation unit 19. Therefore, the signal outputted from the encode unit 16 is supplied to the load modulation unit 20 through the selection unit 17 in the case that the communication mode is the passive mode and the NFC communication device 1 is the target, however, the signal is supplied to the modulation unit 19 through the selection unit 17 in other cases.

An electromagnetic-wave output unit 18 allows electric current to flow in the antenna 11, which is for emitting (the electromagnetic wave of) the carrier wave of a given single frequency from the antenna 11. The modulation unit 19 modulates the carrier wave as electric current flowing in the antenna 11 by the electromagnetic-wave output unit 18 in accordance with the signal supplied from the selection unit 17. Accordingly, the electromagnetic wave obtained by modulating the carrier wave in accordance with data outputted to the encoding unit 16 by the data processing unit 15 is emitted from the antenna 11.

The load modulation unit 20 changes impedance when seeing the coil as the antenna 11 from the outside in accordance with the signal supplied from the selection unit 17. When an RF field (magnetic field) is formed around the antenna 11 by another device outputting the electromagnetic wave as the carrier wave, the impedance when seeing the coil as the antenna 11 is changed, thereby also changing the RF field around the antenna 11. Accordingly, the carrier wave as the electromagnetic wave outputted by another device is modulated (load modulation) in accordance with the signal supplied from the selection unit 17, and data outputted to the encoding unit 16 by the data processing unit 15 is transmitted to another device which outputs the electromagnetic wave.

As a modulation method in the modulation unit 19 and the load modulation unit 20, for example, Amplitude Shift Keying (ASK) can be applied. However, the modulation method in the modulation unit 19 and the load modulation unit 20 is not limited to the ASK but methods such as Phase Shift Keying (PSK) and Quadrature Amplitude Modulation (QAM) and the like can be applied. The amplitude modulation degree is not limited to a certain numeral but can be suitably selected such as 8% to 30%, 50% and 100%.

The control unit 21 performs control and the like of respective blocks included in the NFC communication device 1. That is, the control unit 21 includes a CPU (Central Processing unit) 21A, an EEPROM (Electrically and Erasable Programmable Read Only Memory) 21B, a not-shown RAM (Random Access Memory) and the like. The CPU 21A executes programs stored in the EEPROM 21B, thereby performing control of respective blocks included in the NFC communication device 1 and performing other various processing. The EEPROM 21B stores programs to be executed by the CPU 21A and data necessary for operations of the CPU 21A.

A series of processing performed by executing programs by the CPU 21A can be executed by dedicated hardware provided instead of the CPU 21A. The programs to be executed by the CPU 21A can be installed in the EEPROM 21B in advance, or can be stored (recorded) temporarily or permanently in removable recording media such as a flexible disc, a CD-ROM (Compact Disc Read Only Memory), a MO (Magneto Optical) disc, a DVD (Digital Versatile Disc), a magnetic disc and a semiconductor memory to be provided as so-called packaged software. Moreover, the programs can be transmitted to the NFC communication device 1 by the near field communication and installed in the EEPROM 21B.

A power supply unit 22 supplies necessary power to respective blocks included in the NFC communication device 1. In FIG. 4, lines indicating that the control unit 21 controls respective blocks included in the NFC communication device 1 are omitted because the drawing becomes complicated. Additionally, lines indicating that the power supply unit 22 supplies power to respective blocks included in the NFC communication device 1 are also omitted. The power supply unit may include a battery or may obtain power to be power supply from electric current flowing in the antenna 11 without including the battery. In the latter case, the NFC communication device 1 operates only as the target in the passive mode.

In the above case, the decoding unit 14 and the encoding unit 16 process the Manchester code. However, it is also possible that the decoding unit 14 and the encoding unit 16 not only process the Manchester code but also select one of plural types of codes such as a modified mirror and an NRZ (Non Return to Zero) and process the code.

[Explanation of RFCA Processing]

Any of the NFC communication devices 1 to 3 can be an initiator which outputs the electromagnetic wave at first to start communication. Moreover, in the active mode, the NFC communication devices 1 to 3 output the electromagnetic wave for themselves both in the case that the device becomes the initiator and in the case that the device becomes the target.

Therefore, when two or more NFC communication devices output electromagnetic waves at the same time in a state in which the NFC communication devices 1 to 3 are close to each other, collision occurs and it is difficult to perform communication.

Accordingly, the respective NFC communication devices 1 to 3 detect whether there exist (the RF field of) the electromagnetic wave from another device or not, and starts output of the electromagnetic wave only when there do not exist the electromagnetic wave, thereby avoiding the collision. Here, the processing which detects whether there exists the electromagnetic wave from another device or not and starts output of the electromagnetic wave only when there does not exist the electromagnetic wave is called RFCA (RF Collision Avoidance) for the purpose of avoiding the collision.

The RFCA processing has two processing which are initial RFCA processing performed for the first time by the NFC communication device (one or more devices in the NFC communication devices 1 to 3 in FIG. 1) which intends to become the initiator and response RFCA processing performed by the NFC communication device which starts output of the electromagnetic wave on every start during communication in the active mode. The initial RFCA processing and the response RFCA processing are the same in the point that whether there exists the electromagnetic wave from another device or not is detected before starting output of the electromagnetic wave and the output of the electromagnetic wave is started only when there does not exist the electromagnetic wave. However, the initial RFCA processing differs from the response RFCA processing in the time from the timing when existence of the electromagnetic wave from another device is not detected until the timing when output of the electromagnetic wave should be started.

[Explanation of the Initial RFCA Processing]

The initial RFCA processing will be explained with reference to FIG. 5.

FIG. 5 shows an electromagnetic wave the output of which is started by the initial RFCA processing. In FIG. 5 (same as later-described FIG. 6), the horizontal axis represents time and the vertical axis represents power (level) of the electromagnetic wave outputted by the NFC communication device.

The NFC communication device which intends to become the initiator performs detection of electromagnetic waves from other devices at any time, starting output of the electromagnetic wave when the electromagnetic wave from another device is not detected for a time $T_{IDT}+n \times T_{RFW}$ continuously. In the NFCIP-1, it is prescribed that the initiator outputs the electromagnetic wave in the power from 1.5 A/m to 7.5 A/m. That is, it is necessary that the initiator outputs the electromagnetic wave in the power at least 1.5 A/m or more.

The NFC communication device which intends to become the initiator starts transmission (Send Request) of data (including a command) after a time $T_{IRFG}$ has passed from the output start of the electromagnetic wave.

Here, $T_{IDT}$ in the time $T_{IDT}+n \times T_{RFW}$ is the minimum time for which the NFC communication device which starts transmission/reception of data as the initiator have to check that the electromagnetic wave is not outputted, which is called an initial delay time. When a frequency of a carrier wave of the initial delay time is represented by "fc", for example, a value higher than 4096/fc will be applied. "n" is, for example, an integer of "0" or more to 3 or less, which is generated by using random numbers. $T_{RFW}$ is called an RF waiting time and, for example, 512/fc will be applied. A time $T_{IRFG}$ is called an initial guard time and, for example, a value higher than 5 ms will be applied.

The "n" generated by random numbers is applied to the time $T_{IDT}+n \times T_{RFW}$ for which the electromagnetic wave should not be detected, thereby reducing probability that plural NFC communication devices start output of electromagnetic waves at the same timing.

When the NFC communication device starts output of the electromagnetic wave by the initial RFCA processing, that NGC communication device becomes the initiator. Then, when the active mode is set as the communication mode, the NFC communication device which has become the initiator stops output of the electromagnetic wave after completing transmission of data of the device. On the other hand, when the passive mode is set as the communication mode, the NFC communication device which has become initiator continues outputting the electromagnetic wave started by the initial RFCA processing until the communication with the target is fully completed.

[Explanation of the Response RFCA Processing]

Next, the response RFCA processing will be explained with reference to FIG. 6.

FIG. 6 shows an electromagnetic wave the output of which is started by the response RFCA processing.

The NFC communication device which intends to output the electromagnetic wave in the active mode performs detection of electromagnetic waves from other devices, starts output of the electromagnetic wave when the electromagnetic wave from another device is not detected for a time $T_{ADT}+n \times T_{RFW}$ continuously, then, starts transmission (Send Request) of data after a time $T_{ARFG}$ has passed from the output.

Here, "n" and "$T_{RFW}$" in the time $T_{ADT}+n \times T_{RFW}$ are the same as in the case of the initial RFCA processing of FIG. 5. "$T_{ADT}$" in the time $T_{ADT}+n \times T_{RFW}$ is called an active delay time and, for example, a value of 768/fc or higher as well as 2559/fc or lower will be applied. A time $T_{ARFG}$ is called an active guard time and, for example, a value higher than 1024/fc will be applied.

As apparent from FIG. 5 and FIG. 6, in order to start output of the electromagnetic wave by the initial RFCA processing, the electromagnetic wave should not exist at least for the initial delay time $T_{IDT}$. In order to start output of the electromagnetic wave by the response RFCA processing, the electromagnetic wave should not exist at least for the active delay time $T_{ADT}$.

The initial delay time $T_{IDT}$ is a value higher than 4096/fc, whereas the active delay time $T_{ADT}$ is a value of 768/fc or higher as well as 2559/fc or lower, therefore, when the NFC communication device intends to become the initiator, the state in which the electromagnetic wave does not exist is necessary for a longer period of time than the case of outputting the electromagnetic wave during the communication in the active mode. In other words, when the NFC communication device outputs the electromagnetic wave during the communication in the active mode, the device have to output the electromagnetic wave without a long pause after the state in which electromagnetic wave does not exist as compared with the case in which the device intends to become the initiator.

That is, when the NFC communication device performs communication in the active mode, one NFC communication device outputs the electromagnetic wave for itself to transmit data, after that, stops output of the electromagnetic wave. Then, the other NFC communication device starts output of the electromagnetic wave to transmit data. Therefore, in the communication of the active mode, there exists a period in which both NFC communication devices stops output of the electromagnetic wave. Accordingly, when the NFC communication device intends to become the initiator, it is necessary that the device checked that another device does not output the electromagnetic wave around the NFC communication device which intends to become the initiator for a sufficient period of time for checking that the active-mode communication is not performed around the NFC communication device.

In the active mode, the initiator outputs the electromagnetic wave to thereby transmit data to the target as described above. Then, the target starts output of the electromagnetic wave after the initiator stops output of the electromagnetic wave to thereby transmit data to the initiator. After that, the initiator starts output of the electromagnetic wave after the target stops output of the electromagnetic wave to thereby transmit data to the target, after that, data is exchanged between the initiator and the target in the same manner.

Therefore, in the case that there exists the NFC communication device which intends to become the initiator in the vicinity of the initiator and the target performing communication of the active mode, when the period of time from the timing at which one of the initiator and the target performing the active-mode communication stops output of the electromagnetic wave until the timing at which the other starts output of the electromagnetic wave is long, the electromagnetic wave does not exist during the period, therefore, the NFC communication device which intends to become the initiator starts output of the electromagnetic wave by the initial RFCA processing. In this case, the communication of the active mode which has been already performed is interrupted.

Accordingly, in the response RFCA processing performed during the active-mode communication, it is prescribed that the device have to output the electromagnetic wave without a long pause after the state in which electromagnetic wave does not exist.

[Recognition of the Target at the Time of Starting Communication]

The NFC communication device which intends to become the initiator starts output of the electromagnetic wave by the initial RFCA processing as explained in FIG. 5, after that, performs transmission of data. The NFC communication device which intends to become the initiator becomes the initiator by starting output of the electromagnetic wave and the NFC communication device existing at a position close to the initiator will be the target.

Here, in order to exchange data between the initiator and the target, it is necessary to specify the target with which communication is performed. Accordingly, the initiator requests an NFCID (NFC identification) determined by, for example, random numbers as information specifying each target with respect to one or more targets existing at positions close to the initiator after starting output of the electromagnetic wave by the initial RFCA processing. Then, the target existing at the position close to the initiator transmits the NFCID specifying the device itself to the initiator in response to the request by the initiator.

The initiator specifies the target by the NFCID transmitted from the target as described above, performing data exchange between the initiator and the specified target.

In the active mode, the initiator transmits a later-described command (request) ATR_REQ with the NFCID specifying the device itself. One target makes a response (performs transmission) to the ATR_REQ as a later-described response ATR_RES with respect to the command ATR_REQ with the NFCID specifying the device itself. Accordingly, the initiator and the target recognize each other and specify each other.

On the other hand, in the passive mode, the initiator specifies targets existing in the vicinity of the initiator (positions closed to the initiator) by performing processing called a SDD (Single Device Detection) processing.

In the SDD processing, the initiator requests the NFCID of the target, and the request is made by transmitting a frame called a polling request frame. When the target receives the polling request frame, the target determines the NFCID of the device itself by, for example, random numbers and transmits a frame called a polling response frame in which the NFCID is arranged. The initiator recognizes the NFCID of the target by receiving the polling response frame transmitted from the target.

Since the target in the passive mode transmits data by the load modulation, the target does not perform the RFCA processing. Therefore, in the case that the initiator requests the NFCID with respect to the targets in the vicinity of the initiator in the SDD processing, when there are plural targets in the vicinity of the initiator, the NFCIDs are sometimes transmitted from two or more of the plural targets at the same time. In this case, the NFCIDs transmitted from two or more targets collide, and it is difficult that the initiator recognize the NFCIDs which have collided.

Accordingly, the SDD processing is performed by, for example, a method using a time slot for avoiding the collision of the NFCIDs as much as possible. The method using the time slot is a method in which the target which has received the transmitted polling command determines a timing of transmitting a replay command by random numbers generated by the device itself and transmits the replay command in which the NFCID is stored in accordance with the timing.

As described above, the NFC communication device can perform data exchange with respect to the IC card or the reader/writer included in the IC card systems of ISO/IEC 14443 and ISO/IEC 15693 in a transmission rate applied by the IC card or the reader/writer. In the case that the target is, for example, the IC card in the IC card systems of ISO/IEC 14443 and ISO/IEC 15693, the SDD processing is performed, for example, in the following manner.

The initiator starts output of the electromagnetic wave by the initial RFCA processing, and the IC card as the target obtains power from the electromagnetic wave to start processing. That is, in this case, the target is the IC card of the existing IC card system, therefore, power for operation is generated by the electromagnetic wave outputted by the initiator.

The target prepares to receive the polling request frame within, for example, two seconds at the maximum from the timing in which the target obtains power and becomes in an operative state, waiting for the polling request frame to be transmitted from the initiator.

On the other hand, the initiator can transmit the polling request frame regardless of whether the target is ready for receiving the polling request frame or not.

When the target receives the polling request frame from the initiator, the target transmits the polling response frame to the initiator in the response timing determined by random numbers. When the initiator can normally receive the polling response frame from the target, the initiator recognizes the NFCID of the target as described above. On the other hand, when the initiator fails to normally receive the polling response frame from the target, the initiator can transmits the polling request frame again.

[Command Set Prescribed in ISO/IEC 18092]

In the NFC communication devices, the initiator transmits a command to the target, and the target transmits a response (makes a response) with respect to the command from the initiator to thereby perform communication.

Accordingly, a command set prescribed in ISO/IEC 18092 will be explained below.

FIG. 7 is a command set prescribed in ISO/IEC 18092, showing request commands transmitted from the initiator to the target and response commands transmitted from the target to the initiator.

In FIG. 7, commands in which characters "REQ" are written after underscores (_) represent requests and commands in which characters "RES" are written after underscores (_) represent responses. In the ISO/ICE 18092, six types of requests ATR_REQ, WUP_REQ, PSL_REQ, DEP_REQ, DSL_REQ and RLS_REQ are prepared. Also, six types of responses ATR_RES, WUP_RES, PSL_RES, DEP_RES, DSL_RES and RLS_RES are prepared with respect to the requests in the same manner as requests. As described above, the initiator transmits a request to the target, and the target transmits a response corresponding to the request to the initiator. Therefore, the requests are transmitted by the initiator and the responses are transmitted by the target.

Each of requests and responses is identified by 2-bytes instruction bytes including a 1-byte CMD0 field and a 1-byte CMD1 field. That is, the CMD0 field in the instruction bytes stores a value for identifying the request or the response. Specifically, when the command is the request, "D4" is stored in the CMD0 field, and when the command is the response, "D5" is stored in the CMD0 field.

The CMD1 field in the instruction bytes stores values for identifying respective requests and responses. Specifically, the CMD1 fields of ATR_REQ, ATR_RES, WUP_REQ, WUP_RES, PSL_REQ, PSL_RES, DEP_REQ, DEP_RES, DSL_REQ, DSL_RES, RLS_REQ and RLS_RES store values "00", "01", "02", "03", "04", "05", "06", "07", "08", "09", "0A", and "0B" respectively.

The command ATR_REQ is transmitted to the target when the initiator notifies the target of attribute information (specification) of the device itself as well as requests attribute information of the target. As attribute information of the initiator or the target, there are a transmission rate of data which can be transmitted and received by the initiator or the target and the like. In the command ATR_REQ, an NFCID which specifies the initiator and the like are arranged in addition to the attribute information of the initiator. The target receives the ATR_REQ to thereby recognizing the attribute information and the NFCID of the initiator.

The command ART_RES is transmitted to the initiator when the target receives the command ATR_REQ as a response with respect to the command ATR_REQ. In the command ART_RES, attribute information, the NFCID and the like of the target are arranged.

The information of the transmission rate as attribute information arranged in the command ATR_REQ or the command ART_RES can include all transmission rates of data which can be transmitted and received by the initiator and the target. In this case, the initiator can recognize the transmission rate at which the target can perform transmission/reception as well as the target can recognize the transmission rate at which the initiator can perform transmission/reception by the interaction between the command ATR_REQ and the command ART_RES as the response being made just once.

The command WUP_REQ is transmitted when the initiator selects the target with which communication is performed. That is, it is possible to make the target be in a deselected state (state in which data transmission (response) to the initiator is prohibited) by transmitting the command DSL_REQ from the initiator to the target as described later. The command WUP_REQ is transmitted when the deselected state is released to enable the target to transmit data to the initiator. In the command WUP_REQ, the NFCID of the target the deselected state of which is released is arranged. The target specified by the NFCID arranged in the command WUP_REQ in targets which have received the command WUP_REQ releases the deselected state.

The command WUP_RES is transmitted as a response with respect to the command WUP_REQ when the target specified by the NFCID arranged in the command WUP_REQ in targets which have received the command WUP_REQ releases the deselected state.

The command WUP_REQ is transmitted only when the initiator is in the active mode, and the command WUP_RES is transmitted only when the target is in the active mode.

The command PSL_REQ is transmitted when the initiator changes (sets) communication parameters concerning communication with the target. Here, as communication parameters, for example, the transmission rate of data exchanged between the initiator and the target can be cited.

The command PSL_REQ is transmitted from the initiator to the target. In the command PSL_REQ, a value of the changed communication parameter is arranged. The target receives the command PSL_REQ and changes the communication parameter in accordance with the value of the communication parameter arranged therein. The target further transmits the command PSL_RES as a response with respect to the command PSL_REQ.

The command DEP_REQ is transmitted when the initiator transmits and receives (data exchange between the initiator and the target) data (so-called real data), and data to be transmitted to the target is arranged therein. The command DEP_RES is transmitted as a response with respect to the command DEP_REQ by the target, and data to be transmitted to the initiator is arranged therein. Therefore, data is transmitted from the initiator to the target by the command DEP_REQ, and the data is transmitted from the target to the initiator by the command DEP_RES which is the response with respect to the command DEP_REQ.

The command DSL_REQ is transmitted when the initiator makes the target be in the deselected state. The target which has received the command DSL_REQ transmits the command DSL_RES as a response with respect to the command DSL_REQ and becomes in the deselected state, after that, the target does not respond (does not make a response) to commands other than the command WUP_REQ.

The command RLS_REQ is transmitted when the initiator fully completes communication with the target. The target which has received the command RLS_REQ transmits the command RLS_RES as a response with respect to the command RLS_REQ and fully completes the communication with the initiator.

Here, the commands DLS_REQ and RLS_REQ are common in a point that the target is released from the communication target with respect to the initiator. However, the target released by the command DLS_REQ becomes in the communicable state with the initiator again by the command WUP_REQ, however, the target released by the command RLS_REQ does not become in the communicable state with the initiator unless the initiator begins the process from the initial RFCA processing again. In this point, the command DSL_REQ is different from the command RLS_REQ.

In the following explanation, in order to easily distinguish between the command from the initiator and the command returned from the target as a response, for example, the command ATR_RES which is the response with respect to the command ATR_REQ is called a response ATR_RES. The same goes for other commands transmitted by the target.

The NFC communication devices (respective NFC communication devices 1 to 3) can perform communication complying with NFCIP-1 as ISO/IEC 18092 as well as can perform communication in a power saving mode as an extended function as describe later.

First, communication processing complying with the NFCIP-1 which is basic processing will be explained with reference to FIG. 8 to FIG. 10.

[Communication Processing Complying with ISO/IEC 18092]

FIG. 8 is a flowchart explaining an outline of communication processing complying with NFCIP-1.

First, in Step S1, the NFC communication device to be the initiator performs the initial RFCA processing. In Step S2, the NFC communication device to be the initiator determines whether the RF field has been detected or not by the initial RFCA processing of Step S1. When it is determined that the RF field has been detected in Step S2, the process returns to Step S1, and the same processing is repeated after that. That is, the NFC communication device to be the initiator does not form the RF field during detection of the RF field so as not to interrupt the communication by another NFC communication device which forms the RF field.

On the other hand, when it is determined that the RF field has not been detected in Step S2, the NFC communication device selects any of communication modes of the active mode and the passive mode, becomes the initiator, and then performs selection of the transmission rate and the like.

That is, in the NFCIP-1, it is possible to select the transmission rate used for the actual communication from plural transmission rates such as 106 kbps, 212 kbps and 424 kbps.

In Step S3, the NFC communication device which has become the initiator performs selection of the transmission rate.

Specifically, when communication is performed in the passive mode, the processing proceeds from Step S2 to Step S3-1 of Step S3 including Step S3-1 and Step S3-2. Then, the NFC communication device becomes the initiator, changes the communication mode to the passive mode and selects the transmission rate. Moreover, the NFC communication device which has become the initiator performs the given initial processing and the SDD processing in Step S3-1. After that, the processing proceeds to Step S4-1 of Step S4 including Step S4-1 and Step S4-2.

In Step S4-1, the NFC communication device is activated (started) in the passive mode, exchanging the command ATR_REQ and the response ATR_RES with the target in the passive mode.

On the other hand, when communication is performed in the active mode, the process proceeds from Step S2 to Step S3-2 of Step S3 including Step S3-1 and Step S3-2. Then, the NFC communication device becomes the initiator, changes the communication mode to the active mode and selects the transmission rate. After that, the processing proceeds to Step S4-2 of Step S4 which includes Step S4-1 and Step S4-2.

In Step S4-2, the NFC communication device is activated in the active mode, exchanging the command ATR_REQ and the response ATR_RES with the target.

After Step S4-1 or Step S4-2, the NFC communication device selects the communication parameter when it is necessary to change the communication parameter necessary for the communication (for example, the transmission rate and the like) from the present communication parameter in Step S5. Then, the NFC communication device exchanges the command PSL_REQ and the response PSL_RES in which the selected communication parameter and the like are arranged with the target to change the communication parameter.

In Step S6, the NFC communication device exchanges the command DEP_REQ and the response DEP_RES with the target in accordance with the communication parameter selected in Step S5, performing data exchange (communication) by a data exchange protocol.

In Step S7, the NFC communication device exchanges the command DSL_REQ and the response DSL_RES, or the command RSL_REQ and the response RSL_RES with the target, and the device is deactivated to end the transaction.

The NFC communication device can be set to be the target, for example, by default. The NFC communication device set to be the target by default does not form the RF field and is in a stand-by state until the command is transmitted from the initiator (until the initiator forms the RF field).

The NFC communication device can be the initiator, for example, in accordance with the request from applications. Moreover, in applications, for example, it is possible to select (determine) the communication mode of the active mode or the passive mode as well as the transmission rate.

The NFC communication device which has become the initiator forms the RF field when the RF field is not formed in the outside and the target is activated by the RF field formed by the initiator.

After that, the initiator transmits the command in the selected communication mode and the transmission rate, and the target returns (transmits) the response command in the same communication mode and the same transmission rate as the initiator.

[Detailed Communication Processing in the Passive Mode]

Next, processing performed in the NFC communication devices when data exchange is performed in the passive mode will be explained with reference to a flowchart of FIG. 9.

First, the initiator performs the initial RFCA processing in Step S11, then, proceeds to Step S12 and sets the communication mode to the passive mode. In Step S13, the initiator performs the initial processing and the SDD processing as well as selects the transmission rate.

The processing of Step S11 corresponds to the processing of Step S1 and Step S2 in FIG. 8 and the processing of Step S12 and Step S13 corresponds to the processing of Step S3 (S3-1) in FIG. 8.

After that, the process proceeds to Step S14, where the initiator determines whether the initiator requests attribute information to the target or not. Here, attribute information is information which prescribes communication ability of the NFC communication device, and for example, information of the transmission rate which can be applied by the NFC communication device and the like can be cited.

In Step S14, when it is determined that attribute information is not requested to that target in Step S14, the initiator performs communication with the target in accordance with a unique protocol in Step S15. After Step S15, the processing returns to Step S14 and the same processing is repeated after that.

On the other hand, when it is determined that attribute information is requested to the target, the process proceeds to Step S16 and the initiator transmits the command ATR_REQ to thereby request attribute information to the target. Then, the initiator waits for the response ATR_RES with respect to the command ATR_REQ being transmitted from the target, receiving the response ATR_RES in Step S17.

The processing of Step S16 and S17 corresponds to the processing of Step S4 (Step S4-1) in FIG. 8.

In Step S18, the initiator determines whether the communication parameter, for example, the transmission rate can be changed or not based on the response ATR_RES received from the target in Step S17. When it is determined that it is difficult to change the transmission rate in Step S18, the process skips Step S19 to Step S21 and proceeds to Step S22.

On the other hand, when it is determined that the transmission rate can be changed in Step S18, the process proceeds to Step S19, where the initiator transmits the command PSL_REQ to thereby request change of the transmission rate to the target. Then, the initiator waits for the response PSL_RES with respect to the command PSL_REQ being transmitted from the target, receiving the response PSL_RES in Step S20.

In Step S21, the initiator changes the communication parameter, for example, the transmission rate in accordance with the response PSL_RES received in Step S20.

The processing of Step S18 to S21 corresponds to the processing of Step S5 in FIG. 8.

In Step S22, the initiator performs data exchange with the target in accordance with a data exchange protocol. That is, exchange of the command DEP_REQ and the response DEP_RES is performed. The processing of Step S22 corresponds to the processing of Step S6 in FIG. 8.

After the data exchange is performed in Step S22, the initiator proceeds to Step S23 or Step S25 according to need.

That is, when the initiator allows the target to be in the deselected state, the processing proceeds from Step S22 to S23, where the initiator transmits the command DSL_REQ. Then, the initiator waits for the response DSL_RES with respect to the command DSL_REQ being transmitted from the target, receiving the response DSL_RES in Step S24.

After Step S24, the processing returns to Step S14 and the same processing is repeated after that.

On the other hand, when the initiator fully completes communication with the target, the processing proceeds from Step S22 to Step S25 and the initiator transmits the command RLS_REQ. Then, the initiator waits for the response RLS_RES with respect to the command RLS_REQ being transmitted from the target, receiving the response RLS_RES in Step S26. In Step S26, the processing returns to Step S11 and the same processing is repeated after that.

The processing of Step S23 and S24, or the processing step S25 and S26 corresponds to the processing of Step S7 in FIG. 8.

[Detailed Description in the Active Mode]

Next, processing performed in the NFC communication device when data exchange is performed in the active mode will be explained with reference to a flowchart of FIG. 10.

First, in Step S31, the initiator performs the initial RFCA processing and proceeds to Step S32, where the initiator sets the communication mode to the active mode and selects the transmission rate.

The processing of Step S31 corresponds to the processing of Step S1 and S2 in FIG. 8, and the processing of Step S32 corresponds to the processing of Step S3 (S3-2).

Figure 9:
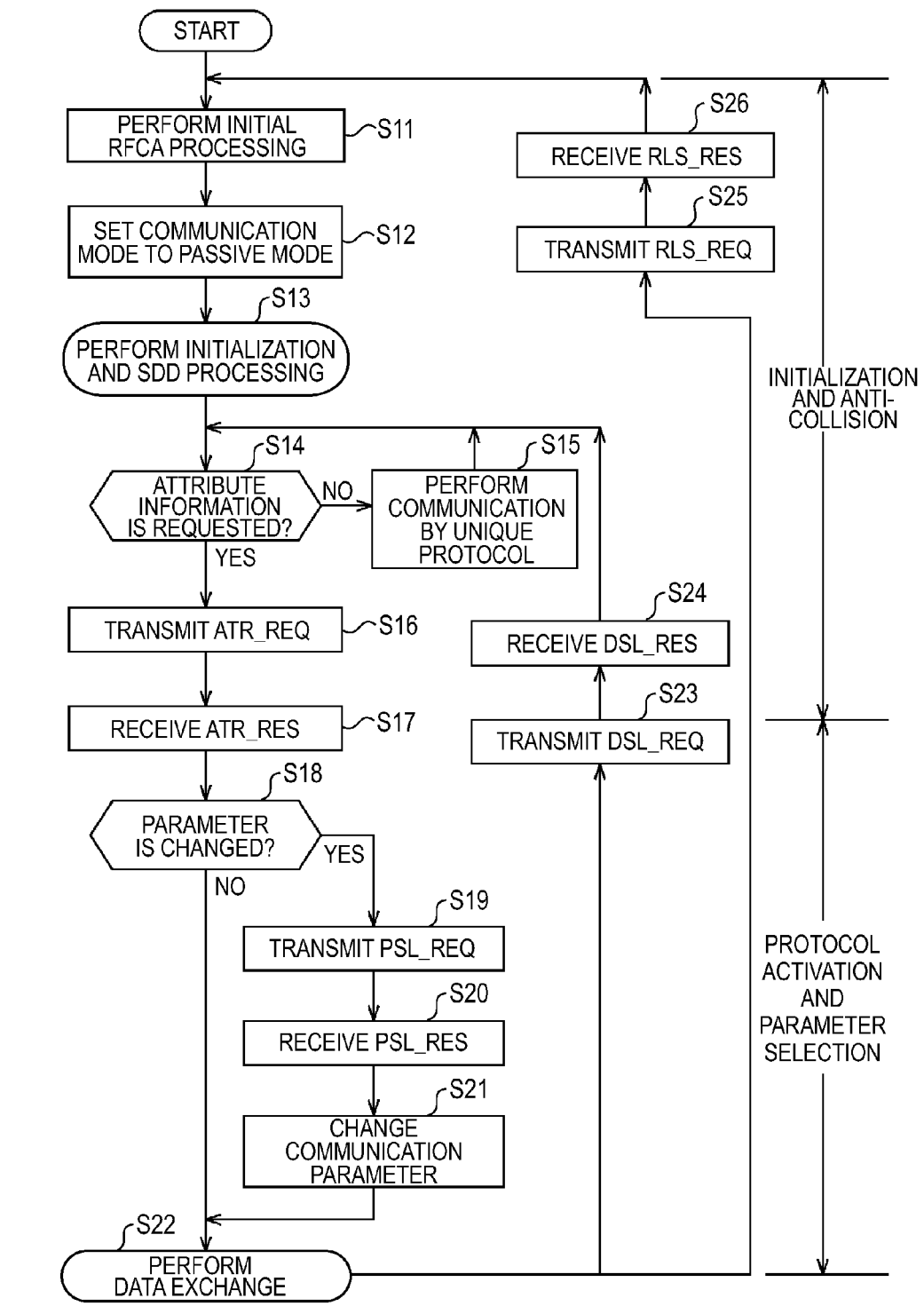
FIG. 9 is a flowchart explaining processing performed by the NFC communication device for exchanging data in the passive mode.

After that, in Step S33 to S39, the same processing as Step S16 to S22 in FIG. 9 is performed respectively.

That is, in Step S33, the initiator transmits the command ATR_REQ, thereby requesting attribute information to the target. Then, the initiator waits for the response ATR_RES with respect to the command ATR_REQ being transmitted from the target, receiving the response ATR_RES in Step S34.

In Step S35, the initiator determines whether the initiator can change the communication parameter, for example, the transmission rate or not based on the response ATR_RES received from the target in Step S34. When it is determined that it is difficult to change the communication parameter in Step S35, the process skips Step S36 to Step S38 and proceeds to Step S39.

On the other hand, in Step S35, when it is determined that the communication parameter can be changed, the process proceeds to Step S36, where the initiator transmits the command PSL_REQ to thereby requesting change (setting) of the communication parameter to the target. Then, the initiator waits for the response PSL_RES with respect to the command PSL_REQ being transmitted from the target, receiving the response PSL_RES in Step S37. In Step S38, the initiator changes the communication parameter, for example, the transmission rate in accordance with the response PSL_RES received in Step S37.

In Step S39, the initiator performs data exchange with the target in accordance with a data exchange protocol. That is, exchange of the command DEP_REQ and the response DEP_RES is performed.

The processing of Step S33 and S34 corresponds to the processing of S4 (S4-2) in FIG. 8, and the processing of Step S35 to S38 corresponds to the processing S5 of FIG. 8. The processing of Step S39 corresponds to the processing of Step S6 in FIG. 8.

After the data exchange is performed in Step S39, the process proceeds to Step S40 or S44 according to need.

That is, when the initiator is allows the target with which communication is performed now to be in the deselected state and allows any of targets which have already been in the deselected state to be woken up, the process proceeds from Step S39 to Step S40. In Step S40, the initiator transmits the command DSL_REQ to the target which will be in the deselected state. Then, the initiator waits for the response DSL_RES with respect to the command DSL_REQ being transmitted from the target, receiving the response DSL_RES in Step S41. The target which has transmitted the response DSL_RES becomes in the deselected state.

After that, the process proceeds from Step S41 to S42, and the initiator transmits the command WUP_REQ to the target to be woken up. Then, the initiator waits for the response WUP_RES with respect to the command WUP_REQ being transmitted from the target, receiving the response WUP_RES in Step S43. The target which has transmitted the response WUP_RES wakes up and this woken-up target will be a target of processing after Step S35 performed by the initiator after that.

On the other hand, when the initiator fully completes the communication with the target, the process proceeds from Step S39 to S44. In Step S44, the initiator transmits the command RLS_REQ. Then, the initiator waits for the response RLS_RES with respect to the command RLS_REQ being transmitted from the target, receiving the response RLS_RES in Step S45. After Step S45, the processing returns to Step S31 and the same processing is repeated after that.

The processing of Step S40 to S43, or the processing of Step S44 and Step S45 corresponds to the processing of Step S7 in FIG. 8.

The communication processing complying with the NFCIP-1 has been explained with reference to FIG. 8 to FIG. 10 as above.

[Explanation of Communication Functions in the Power Saving Mode]

Next, communication in the power saving mode which can be performed by the NFC communication devices of the communication system in FIG. 1 as an extended function will be explained with reference to FIG. 11 and FIG. 12. The following explanation will be made on the assumption that the NFC communication devices perform communication in the passive mode. The communication in the active mode will be explained collaterally about a different point in explanation of communication in the passive mode.

Figure 11:
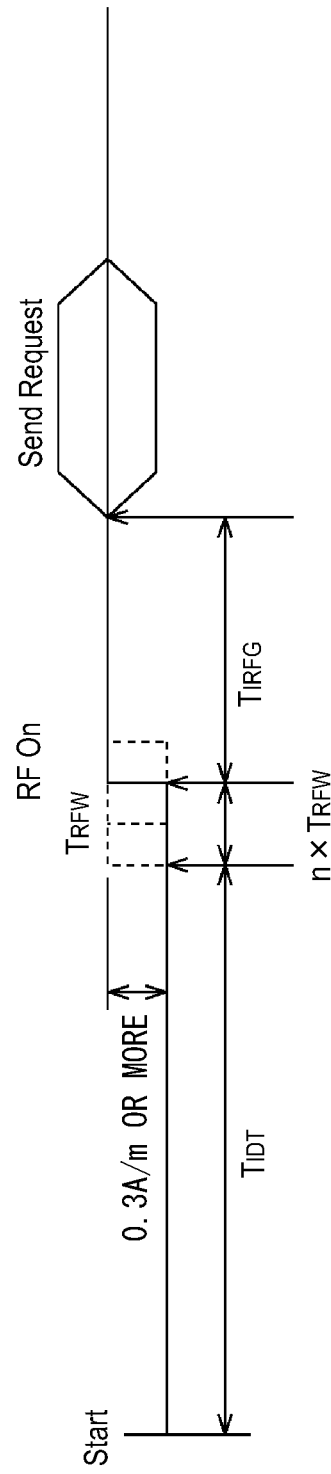
FIG. 11 is a view explaining communication in a power saving mode.
Figure 12:
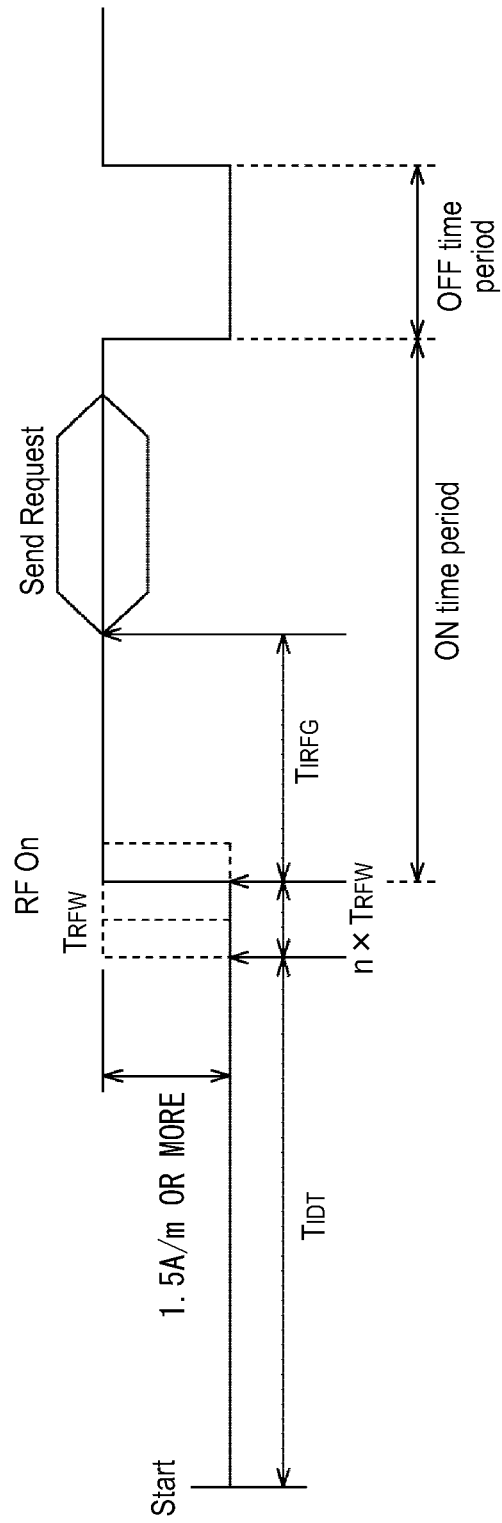
FIG. 12 is a view explaining communication in the power saving mode.

The NFC communication device has a low RF output communication function shown in FIG. 11 and an intermittent RF output communication function shown in FIG. 12 as communication functions in the power saving mode.

The low RF output communication function is a function of performing communication in a state in which power of the electromagnetic wave (magnetic field strength: unit A/m) outputted by the initiator is made to be lower than a value prescribed by NFCIP-1 as shown in FIG. 11.

As explained with reference to FIG. 5, it is prescribed that the initiator outputs the electromagnetic wave in the power from 1.5 A/m to 7.5 A/m in NFCIP-1.

On the other hand, the NFC communication device having the low RF output communication function can perform communication when the power of the electromagnetic wave is at least 0.3 A/m. That is, the initiator can output the electromagnetic wave in the power from 0.3 A/m to 7.5 A/m in the low RF output communication function.

Accordingly, the communication can be performed in a state in which the power of the electromagnetic wave is made to be lower than the value proscribed by NFCIP-1, therefore, it is possible to reduce power consumption of the initiator which continues outputting the electromagnetic wave.

Next, the intermittent RF output function will be explained.

The intermittent RF output function is a function of performing communication in a state in which a fixed period during which output of the electromagnetic wave is stopped is provided after the initiator outputs the electromagnetic wave for a fixed period and repeating ON and OFF of output of the electromagnetic wave. That is, the initiator outputs the electromagnetic wave in given power for a fixed period from the output start of the electromagnetic wave after the time $T_{IDT}+n\times T_{RFW}$ has passed (an RF output ON period shown by "ON time period" in FIG. 12). The RF output ON period is a time period set by adding a given margin of time to a period of time in which transmission (Send Request) of data (including commands) is completed. After that, the initiator stops output of the electromagnetic wave for a fixed period (an RF output OFF period shown by "OFF time period) in FIG. 12. After that, the initiator repeats ON and OFF of output of the electromagnetic wave in the RF output ON period and the RF output OFF period.

As compared with the communication complying with NFCIP-1, it is possible to reduce power consumption of the initiator because there is a period in which output of the electromagnetic wave can be stopped as apparent with reference to FIG. 12.

It is preferable that the NFC communication device has any one of the low RF output communication function and the intermittent RF output communication function, or it is also preferable that the NFC communication device has both of the low RF output communication function and the intermittent RF output communication function. When both of the low RF output communication function and the intermittent RF output communication function are executed, for example, the NFC communication device which intends to become the initiator outputs the electromagnetic wave in power of 0.3 A/m after the time $T_{IDT}+n\times T_{RFW}$ has passed. Then, the NFC communication device which intends to become the initiator stops output of the electromagnetic wave in the RF output OFF period after the RF output ON period has passed from the output start of the electromagnetic wave. After that, the NFC communication device which intends to become the initiator starts outputs of the electromagnetic wave in power of 0.3 A/m.

Next, commands or parameters included in the NFC communication device for performing communication processing in the above power saving mode in addition to the commands or parameters prescribed by NFCIP-1 will be explained.

[Explanation of Extended Command Set]

FIG. 13 shows a command set included in addition to the command set shown in FIG. 7 by the NFC communication device.

That is, the NFC communication device having the power saving mode can exchange a command PSL2_REQ and a response command PSL2_RES corresponding to the command PSL2_REQ in addition to the command set shown in FIG. 7.

The command PSL2_REQ stores "D4" in the CMD0 field and stores "0C" in the CMD1 field to thereby be identified. The response PSL2_RES stores "D5" in the CMD0 field and stores "0D" in the CMD1 field to thereby be identified.

The command PSL2_REQ is transmitted from the initiator to the target when the initiator changes (sets) extended communication parameters concerning communication with the target (extended communication parameters). In the command PSL2_REQ, a value of the changed extended communication parameter is arranged. The target receives the command PSL2_REQ and changes the communication parameter in accordance with the value of the extended communication parameter arranged therein. Moreover, the target transmits the command PSL2_RES as a response with respect to the command PSL2_REQ.

Next, the detailed contents of respective commands for performing communication processing in the power saving mode will be explained.

[Explanation of the Command ATR_REQ]

FIG. 14 shows a structure of the command ART_REQ.

The command ATR_REQ includes the CMD0 field, the CMD1 field and Byte0 to Byte n+14 fields ("n" is an integer value of "0" or larger) from the head (from the left in the drawing).

In the CMD0 field and the CMD1 field, values "D4" and "00" indicating that the command is the command ATR_REQ are stored as described above.

In the Byte0 to Byte9 fields, an NFCID specifying the NFC communication device which transmits the command ATR_REQ, namely, specifying the initiator is stored.

In the Byte10 field, DIDi which is a device ID of the initiator which transmits the command ATR_REQ is set. Accordingly, the Byte10 field is referred to as a DIDi field in the following description.

In the Byte11 field, a bit rate (transmission rate) BSi used when the initiator which transmits the command ATR_REQ transmits data is set.

In the Byte12 field, a bit rate (transmission rate) BRi used when the initiator which transmits the command ATR_REQ receives data is set.

In the Byte13 field, an option parameter PPi concerning the initiator which transmits the command ATR_REQ is set. The Byte13 field is also referred to as a PPi field in the following description. The details of the PPi field will be described later with reference to FIG. 15.

Respective fields of Byte 14 to Byte 14+n are fields in which various information designated by an architect and the like is set, which are prepared for options. The value "n" can be changed by the architect and the like, which is an integer value of "0" or larger. The value "n" is set in the PPi field as described later. In the following description, respective n-pieces Gi fields are referred to as Gi[0] to Gi[n] fields in the order of arrangement (in the order from the left in FIG. 14).

[Details of the PPi Field]

Figure 15:
FIG. 15 is a chart showing a structure of a PPi field.

FIG. 15 shows a structure of the PPi field.

The PPi field includes a bit "0" to a bit "7" as shown in FIG. 15.

The PPi field is the same as NFCIP-1 except a point that the bit 7 can take a value "1" in addition to "0". In other words, when the bit 7 is "0", the PPi field is the PPi field itself prescribed by NFCIP-1.

In NFCIP-1, it is prescribed that the bit 7 takes "0", however, the communication system of FIG. 1 is extended so that the bit7 can be "1". When the bit7 is "1", it is indicated that the initiator has the communication function in the power waving mode.

"0" is set in the bit 6, the bit 3 and the bit 2.

In the bit 4 and bit 5, information LRi for designating the valid length of data, namely, the value "n" is set, which is described above with reference to FIG. 14 is set.

In the bit 1, information Gi indicating whether the Gi[0] to Gi[n] fields are arranged or not (exist or not) is set. Since the information Gi will be "0" or "1", for example, "0" indicates that the field is not arranged (not exist) and "1" indicates that the field is arranged (exists).

In the bit "0", information indicating whether NAD (Node Address) is used or not ("0" or 1) is set. NAD represents a sub-address of a device ID in the initiator which transmits the command ATR_REQ set in the above Byte10 field of FIG. 14, namely, the DIDi field. It is prescribed in NFCIP-1 that one device ID can have 16 sub-addresses.

In the bit "0", for example, when "0" indicates that NAD is not used and "1" indicates that NAD is used, the fact that "0" is set in the bit "0" means that the initiator which transmits the command ATR_REQ does not use the sub-address. On the other hand, the fact that "1" is set in the bit "0" means that the initiator which transmits the command ATR_REQ uses the sub-address.

As described above, the value included in the PPi field of the command ATR_REQ is extended, and the presence of the communication function in the power saving mode can be transmitted from the initiator to the target.

[Explanation of the Command ATR_RES]

FIG. 16 shows a structure of the command ART_RES.

As shown in FIG. 16, the command ART_RES includes the CMD0 field, the CMD1 field and Byte0 to Byte n+15 fields ("n" is an integer value of "0" or larger) from the head (from the left in the drawing).

In the CMD0 field and the CMD1 field, values "D5" and "01" indicating that the command is the command ATR_RES are stored as described above.

In the Byte0 to Byte12 fields, the same data as Byte0 to Byte12 fields of the command ATR_REQ is set.

That is, in the Byte0 to Byte9 fields, an NFCID specifying the NFC communication device which transmits the command ATR_RES, namely, specifying the target is stored.

In the Byte10 field, DIDt which is a device ID of the target which transmits the command ART_RES is set. Accordingly, the Byte10 field is referred to as a DIDt field in the following description.

In the Byte11 field, a bit rate (transmission rate) BSt used when the target which transmits the command ATR_RES transmits data is set.

In the Byte12 field, a bit rate (transmission rate) BRt used when the target which transmits the command ATR_RES receives data is set.

In the Byte13 field, a timeout value "T0" of the target is set.

The Byte14 field is the same as Byte13 field of the command ATR_REQ. That is, an option parameter PPt concerning the target which transmits the command ATR_RES is set in Byte14 field. The Byte14 field of the command ATR_RES is also referred to as a PPt field in the following description. The details of the PPt field will be described later with reference to FIG. 17.

Byte15 to Byte 15+n fields are respectively the same as Byte 14 to Byte 14+n fields of the command ATR_REQ. That is, Byte15 to Byte 15+n fields are fields in which various information designated by an architect and the like is set, which are prepared for options. The value "n" can be changed by the architect and the like, which is an integer value of "0" or larger. The value "n" is set in the PPt field as described later. In the following description, respective n-pieces Gt fields are referred to as Gi[0] to Gt[n] fields in the order of arrangement (in the order from the left in FIG. 16).

[Details of the PPt Field]

Figure 17:
FIG. 17 is a chart showing a structure of a PPt field.

FIG. 17 shows a structure of the PPt field.

As shown in FIG. 17, the PPt field is configured as the PPi field of the command ATR_REQ.

That is, the PPt field is the same as NFCIP-1 except a point in which the bit7 can take a value "1" in addition to "0". In other words, when the bit7 is "0", the PPt field is the PPt field itself prescribed by NFCIP-1.

It is prescribed that the bit7 is set to "0" in NFCIP-1, however, the communication system of FIG. 1 is extended so that the bit7 can be "1". When the bit7 is "1", it is indicated that the target has the communication function in the power waving mode.

"0" is set in the bit 6, the bit 3 and the bit 2.

In the bit 4 and bit 5, information LRt for designating the valid length of data which is the value "n" described above with reference to FIG. 16 is set.

In the bit 1, information Gt indicating whether the Gt[0] to Gt[n] fields are arranged or not (exist or not) is set. Since the information Gt will be "0" or "1", for example, "0" indicates that the field is not arranged (not exist) and "1" indicates that the field is arranged (exists).

In the bit "0", information indicating whether NAD (Node Address) is used or not ("0" or 1) is set. NAD represents a sub-address of a device ID in the target which transmits the command ATR_RES set in the above Byte 10 field of FIG. 16, namely, the DIDi field. It is prescribed in NFCIP-1 that one device ID can have 16 sub-addresses.

In the bit "0", for example, when "0" indicates that NAD is not used and "1" indicates that NAD is used, the fact that "0" is set in the bit "0" means that the target which transmits the command ATR_RES does not use the sub-address. On the other hand, the fact that "1" is set in the bit "0" means that the target which transmits the command ATR_RES uses the sub-address.

As described above, the value included in the PPt field in the response ART_RES is extended, and the presence of the communication function in the power saving mode can be transmitted from the target to the initiator.

Next, the command PSL2_REQ and the response PSL2_RES corresponding to the command PSL2_REQ shown in FIG. 13 will be explained.

[Explanation of the Command PSL2_REQ]

FIG. 18 shows a structure of the command PSL2_REQ.

The command PSL2_REQ includes the CMD0 field, the CMD1 field and Byte0 to Byte 7 fields from the head (from the left in the drawing).

In the CMD0 field and the CMD1 field, values "D4" and "0C" indicating that the command is the command PSL2_REQ are stored as described above.

In the Byte0 field, FLAGs indicating valid or invalid of the Byte1 field and Byte4 to Byte7 fields are stored as described later with reference to FIG. 19. The Byte0 field is also referred to as a FLAG field in the following description.

In the Byte1 field, the magnetic field strength (power) of the electromagnetic wave generated by the initiator is set. In NFCIP-1, it is prescribed that the initiator outputs the electromagnetic wave in a range from 1.5 to 7.5 A/m, in which 1.5 A/m is the lower limit value (Hmin) and 7.5 A/m is the upper limit value (Hmax). When "00" is set in the Byte1 field, it is indicated that the initiator outputs the electromagnetic wave in the range from 1.5 to 7.5 A/m prescribed by NFCIP-1. On the other hand, when "01" is set in the Byte1 field, it is indicated that the initiator outputs the electromagnetic wave in a range from 0.3 to 7.5 A/m, in which 0.3 A/m is the lower limit value.

In other words, when "00" is set in the Byte1 field, it is indicated that the initiator performs communication within the range of the NFCIP-1 standard shown with reference to FIG. 5. On the other hand, when "01" is set in the Byte1 field, it is indicated that the initiator can perform communication using the low RF output communication function explained with reference to FIG. 11.

In the present embodiment, since the communication is performed in the passive mode, only the initiator outputs the electromagnetic wave of the set magnetic field strength, however, when the communication in the active mode is selected, the electromagnetic wave within the range of magnetic field strength set in the Byte1 field is outputted from the initiator and the target, respectively.

The Byte2 and Byte3 fields are reserved for future use (RFU: Reserved For Future Use), in which, for example, "0" is set.

In two bytes of Byte4 and Byte 5 fields, the RF output ON period (On time period) in the intermittent RF output communication function explained with reference to FIG. 12 is set by an integer binary value without a sign. A unit of values set in the Byte4 and Byte5 fields is, for example, millisecond (msec).

In two bytes of Byte6 and Byte 7 fields, the RF output OFF period (OFF time period) in the intermittent RF output communication function explained with reference to FIG. 12 is set by an integer binary value without a sign. A unit of values set in the Byte6 and Byte7 fields is, for example, millisecond (msec).

[Details of the FLAG Field]

FIG. 19 shows a structure of a FLAG field.

The FLAG field includes a bit "0" to a bit "7" as shown in FIG. 19.

In the bit 7, a flag indicating valid or invalid of magnetic field strength of the electromagnetic wave set in the Byte1 field in the command PSL2_REQ is stored. For example, when the bit 7 is "0", it is indicated that the magnetic field strength of the electromagnetic wave set in the Byte1 field is invalid, and when the bit 7 is "1", it is indicated that magnetic field strength of the electromagnetic wave set in the Byte1 field is valid.

In the bit 6, a flag indicating valid or invalid of the RF output ON period set in the Byte4 and Byte5 fields in the command PSL2_REQ is stored. For example, when the bit 6 is "0", it is indicated that the RF output ON period is invalid and when the bit 6 is "1", it is indicated that the RF output ON period is valid.

In the bit 5, a flag indicating valid or invalid of the RF output OFF period set in the Byte6 and Byte7 fields in the command PSL2_REQ is stored. For example, when the bit 5 is "0", it is indicated that the RF output OFF period is invalid and when the bit 5 is "1", it is indicated that the RF output OFF period is valid.

In the bit 4, a flag indicating the presence of transition to the passive mode is stored. For example, when the bit 4 is "0", it is indicated that the transition to the passive mode does not exist, and when the bit 4 is "1", it is indicated that the transition to the passive mode exists. The details will be described later with reference to FIG. 22 and FIG. 23. In the communication in the power saving mode, when the communication is performed in the passive mode, the communication is performed along the flow of the active mode prescribed by NFCIP-1 at first, then, the communication mode is changed to the passive mode. Accordingly, the flag "1" in the bit 4 means that the communication is performed in the passive mode and the flag "0" in the bit 4 means that the communication is performed in the active mode.

[Explanation of the Command PSL2_RES]

Figure 20:
FIG. 20 is a chart showing a structure of a command PSL2_RES.

FIG. 20 shows a structure of the command PSL2_RES.

In the CMD0 field and the CMD1 field, values "D5" and "0D" indicating that the command is the command PSL2_RES are stored as described above.

In Byte0 field, a message MSG indicating a reply from the target with respect to the command PSL2_REQ is stored as described later with reference to FIG. 21. The Byte0 field is also referred to as a MSG field in the following description.

Byte1 to Byte7 fields are reserved for future use (RFU: Reserved For Future Use). In Byte1 to Byte7 fields, for example, "0" is set.

[Details of the MSG Field]

FIG. 21 shows a structure of the MSG field.

The MSG field includes a bit "0" to a bit 7 as shown in FIG. 21.

In the bit 7, a response message (flag) indicating propriety of the support to the power saving mode using the RF output communication function is stored. For example, when the bit 7 is "0", it is indicated that the device is set in a state of operating in the power within 0.3 to 7.5 A/m. When the bit 7 is "1", the device does not have ability of operating in the power within 0.3 to 7.5 A/m. The bit 7 in the MSG field is also referred to as a low RF output OK bit in the following description.

In the bit 6, a response message (flag) indicating propriety of the support to the power saving mode using the intermittent output communication function is stored. For example, when the bit 6 is "0", it is indicated that the device is set in a state of operating in response to ON/OFF of the electromagnetic wave in the RF output ON period and the RF output OFF period set in Byte4 to Byte7 fields of the command PLS2_REQ. On the other hand, when the bit 6 is "1", the device does not have ability of operating in response to ON/OFF of the electromagnetic wave. The bit 6 in the MSG field is also referred to as an intermittent output OK bit.

In the active mode, when the target sends a reply by setting the low RF output bit to "0", the target also transmits a command by outputting the electromagnetic wave in the low RF output. Similarly, when the target sends a reply by setting the intermittent output OK bit to "0", the target also transmits the command by outputting the electromagnetic wave in the RF output ON period and the RF output OFF period as received from the initiator.

In the bit 5, a response message indicating an operation state of transition to the passive mode is stored. For example, when the bit 5 is "1", it is indicated that the setting of the parameter designated by the command PSL2_REQ has been completed and the transition to the passive mode has been completed (stand-by in the passive mode). On the other hand, when the bit 5 is "0", it is indicated that the transition to the passive mode is not performed. Hereinafter, the bit 5 in the MSG field is also referred to as a passive OK mode.

The bit 4 to the bit "0" are reserved for future use.

The command PSL2_REQ and the response PSL2_RES corresponding to the command PSL2_REQ having the above parameters are exchanged between the initiator and the target for checking the propriety of execution of the power saving mode.

[Communication Processing in which Power Saving Mode is Possible]

Accordingly, next, communication processing in the case that the communication is performed in the power saving mode will be explained with reference to FIG. 22 and FIG. 23.

First, the initiator starts communication processing by the same processing as in the case of the active mode regardless whether the final communication mode is the active mode or the passive mode.

Figure 10:
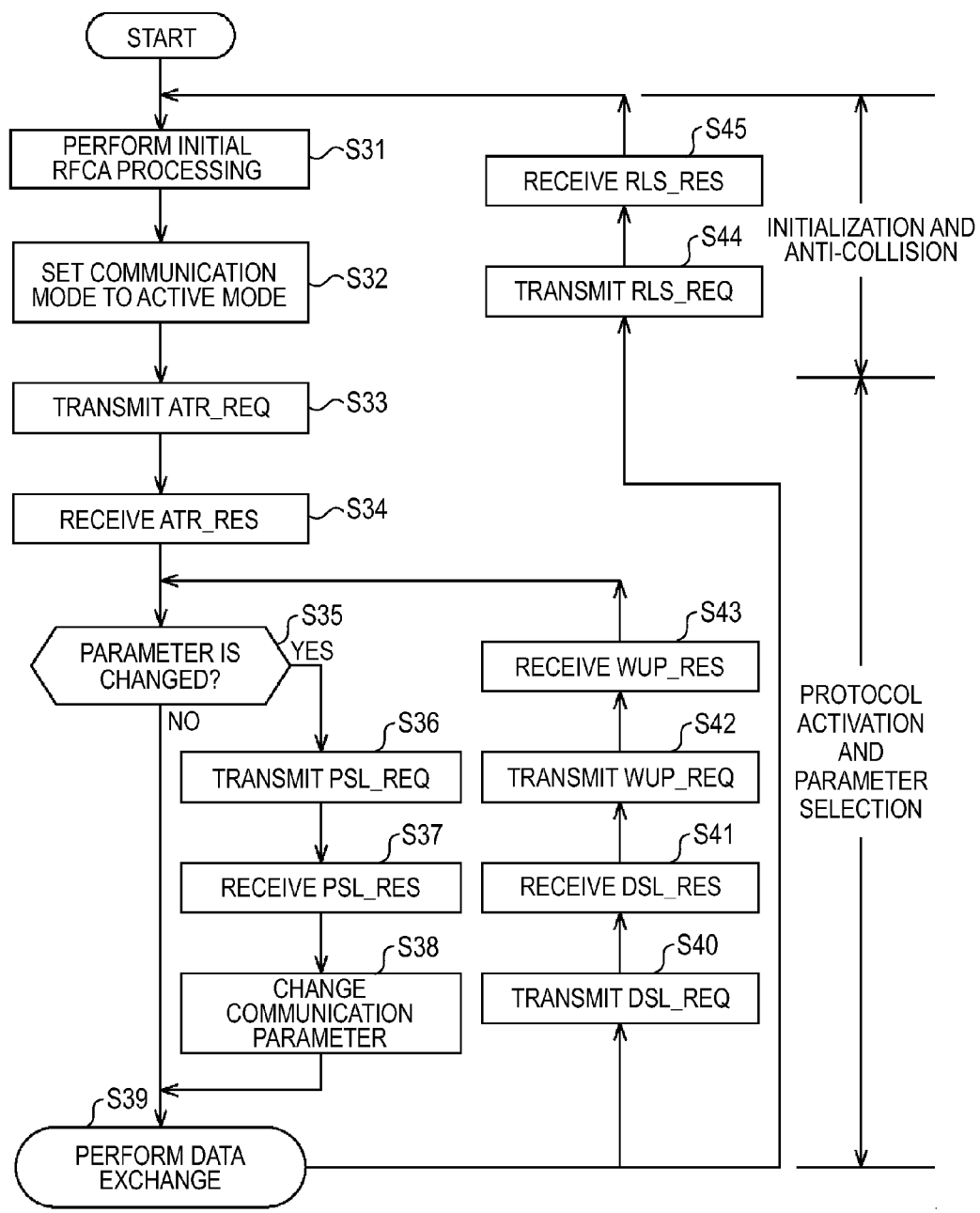
FIG. 10 is a flowchart explaining processing performed in the NFC communication device for exchanging data in the active mode.
Figure 22:
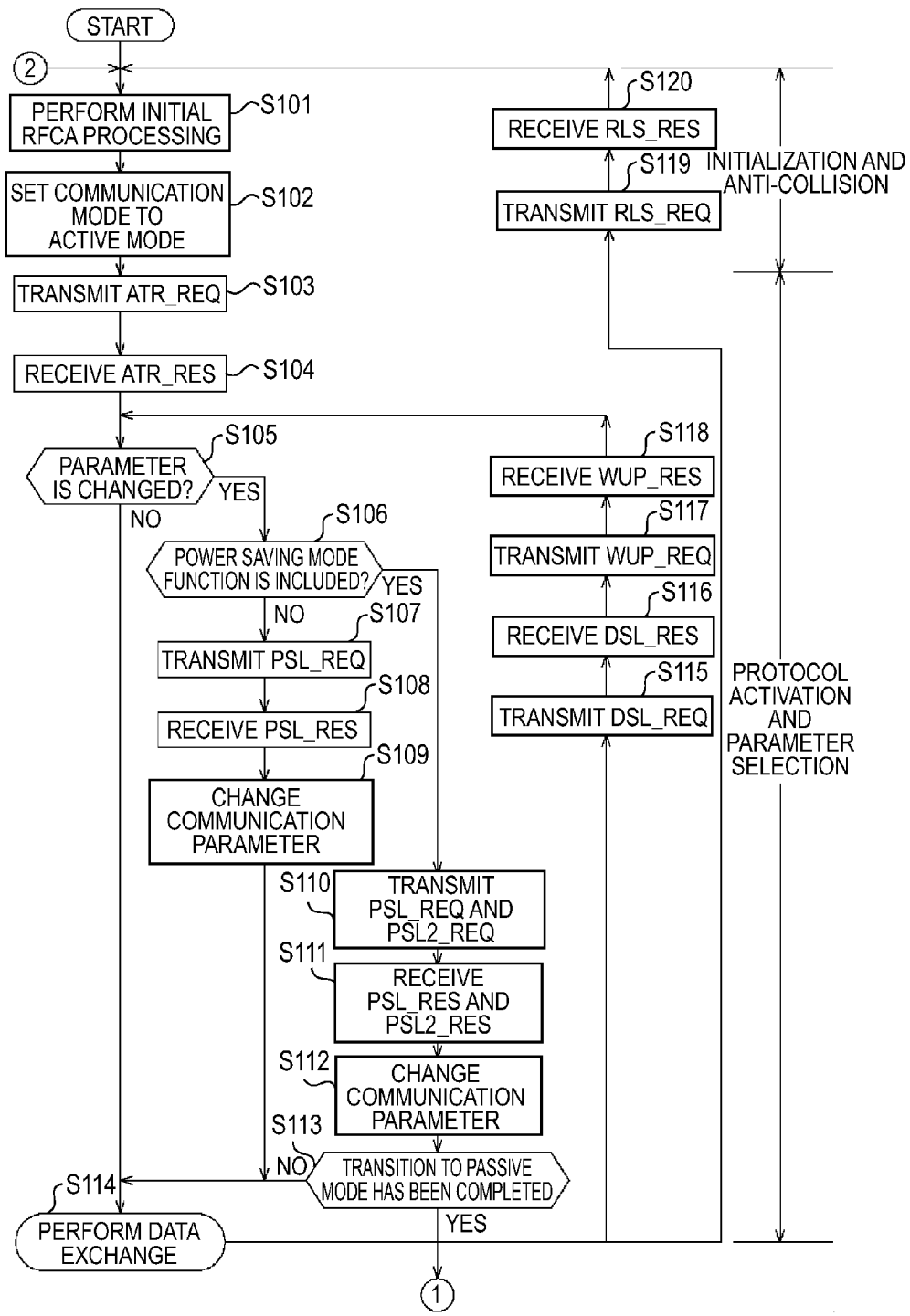
FIG. 22 is a flowchart explaining communication processing in the case of performing the communication in the power saving mode.

Accordingly, the processing of Step S101 to S105 in FIG. 22 is the same as the processing of Step S31 to S35 in FIG. 10. However, the transmission of the command ATR_REQ and the response ATR_RES in Step S103 and S104 in FIG. 22 are different in a point that the value "1" can be taken in addition to "0" in the bit 7 of the PPi field as well as the PPt field.

In Step S105, when it is determined that the communication parameter can be changed based on the response ATR_RES, the process proceeds to Step S106, and the initiator determines whether the target has the communication function in the power saving mode or not.

In Step S106, when it is determined that the target does not have the communication function in the power saving mode, that is, when the bit 7 in the PPt field of the response ATR_RES IS "0", the processing proceeds to Step S107. The processing of Step S107 to S109 is the same as the processing from Step S36 to S38 of FIG. 10.

After the processing of Step S107 to s109 is executed, the processing proceeds to Step S114. As a result, when the processing from Step S107 to S109 has been executed, the initiator and the target perform communication (data exchange) in the active mode complying with NFCIP-1 in the same manner as the processing explained with reference to FIG. 10.

On the other hand, in Step S106, when it is determined that the target has the communication function in the power saving mode, that is, when the bit 7 in the PPt field of the response ATR_RES is "1", the processing proceeds to Step S110.

In Step S110, the initiator transmits the commands PSL_REQ and PSL2_RES, thereby requesting change of the communication parameter and the extended communication parameter to the target. Then, the response PSL_RES corresponding to the command PSL_REQ and the response PSL2_RES corresponding to the command PSL2_REQ are transmitted from the target. The initiator receives the responses PSL_RES and PSL2_RES in Step S111. After that, in Step S112, the initiator changes the communication parameter and the extended communication parameter in accordance with the responses PSL_RES and PSL2_RES received in Step S111.

In Step S113, the initiator determines whether the target has completes the transition to the passive mode or not. That is, the initiator determines whether the passive OK bit of the response PSL2_RES returned by the target is "1" or not in Step S113. When it is determined that the target has not completed the transition to the passive mode, that is, when the passive OK bit is "0", the process proceeds to Step S114.

In Step S114, the initiator and the target perform communication (data exchange) in the active mode which is the same as the processing explained with reference to FIG. 10. However, the initiator and the target have agreed with each other in the power saving mode by the commands PSL2_REQ and PSL2_RES, therefore, they performs communication in the active mode of the power saving mode in the processing after Step S114.

That is, when the low RF output OK bit in the MSG field received by the initiator from the target is "0", the communication in the low RF output is performed. When the intermittent output OK bit in the MSG field received by the initiator from the target is "0", the communication by the intermittent RF output is performed. Moreover, when the low RF output OK bit and the intermittent output OK bit in the MSG field are "0", the communication of the low RF output as well as the intermittent RF output is performed.

Since the processing of Step S115 to S120 in FIG. 22 is the same as in the case of Step S40 to S45 in FIG. 10 respectively, the explanation thereof is omitted.

Figure 23:
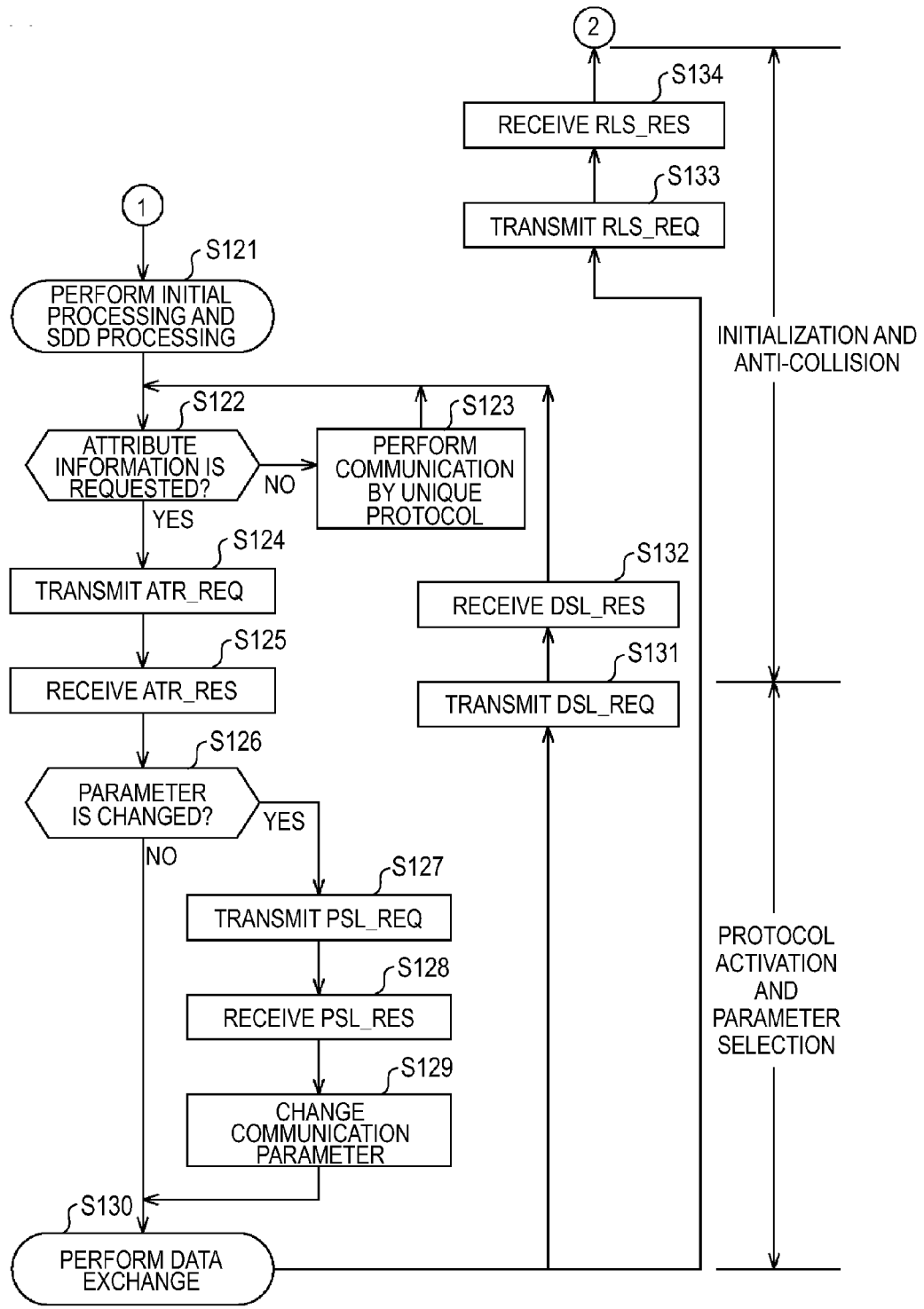
FIG. 23 is a flowchart explaining communication processing in the case of performing the communication in the power saving mode.

On the other hand, when it is determined that the target have completed the transition to the passive mode in Step S113, that is, when the passive OK bit is "1", the processing proceeds to Step S121 in FIG. 23.

The processing after Step S121 is basically the same as the case in the passive mode explained with reference to FIG. 9. That is, the processing of Step S121 to S134 in FIG. 23 is the same as the processing of Step S13 to S26 respectively. However, the initiator and the target perform the processing of Step S121 and subsequent steps in the low RF output mode or the intermittent RF output mode, or in the both mode, in which they have agreed by the transmission/reception of the commands PSL2_REQ and PSL2_RES.

As described above, the NFC communication device can perform operations in the power saving mode of the low RF output (low RF output mode) or the power saving mode of the intermittent RF output (intermittent RF output mode).

In the low RF output mode, only the power of the electromagnetic wave to be outputted is different in the passive mode as well as the active mode. Therefore, the initiator and the target can perform communication in the same manner as in the case of NFCIP-1.

In the intermittent RF output mode, only the initiator outputs (the magnetic wave of) the carrier wave and the target performs load modulation of the carrier wave outputted by the initiator to transmit data in the passive mode. Therefore, the target in the intermittent RF output mode may perform load modulation (transmit data) at a timing when the initiator outputs the carrier wave, therefore, the communication can be normally performed also in the intermittent RF output mode. Since the target can recognize in which period the initiator stops output of the carrier wave by exchanging the commands PSL2_REQ and PLS2_RES, for example, the target can stop the processing of detecting the electromagnetic wave in that period.

On the other hand, in the active mode, both of the initiator and the target output carrier waves for themselves to transmit data, and stops output of the carrier waves after the data transmission. Therefore, there exists a state in which both of the initiator and the target stop the output of carrier waves during the communication in the active mode as explained with reference to FIG. 6. Accordingly, the communication in the active mode is likely to be interrupted by another NFC communication device which intends to become the initiator starting output of the carrier wave by the initial RFCA, however, the following action will be made to this matter.

As described above, it is prescribed that another NFC communication device which intends to become the initiator checks that the electromagnetic wave is not outputted at least for the initial delay time $T_{IDT}$ as the initial RFCA processing. Conversely, another NFC communication device to be the initiator does not output the electromagnetic wave in the case that the time period for which the electromagnetic wave is not outputted is within the initial delay time $T_{IDT}$. Therefore, in the active mode of the intermittent output OFF mode, it is possible to surely avoid the interruption of communication in the active mode when the RF output OFF period is within the initial delay time $T_{IDT}$, namely, within 4094/fc.

However, when the RF output OFF period is limited to within the initial delay time $T_{IDT}$, the reduction of the power consumption is also limited.

Accordingly, the case in which the RF output period is allowed to be longer than the initial delay time $T_{IDT}$ will be explained. When the RF output period is allowed to be longer than the initial delay time $T_{IDT}$, another NFC communication device which intends to be the initiator may output the electromagnetic wave.

However, at the beginning of communication (transaction), the commands ATR_REQ, ATR_RES, PSL2_REQ and PSL2_RES are exchanged as described above, and the bit 7 in the PPt field of the command ATR_REQ is "1" when the device operates in the intermittent RF output mode. That is, the NFC communication devices (the initiator and the target) can recognize that the communication started in a state in which the bit 7 in the PPt field of the command ATR_REQ is "1" is the communication of the intermittent RF output mode. Therefore, the NFC communication device which has started the communication can avoid the response to output of the electromagnetic wave from another NFC communication device which intends to become the initiator in the communication after the bit 7 in the PPt field is allowed to be "1", until the bit 7 in the PPt field is allowed to be "0" next (until the intermittent RF output mode is released). Accordingly, even when the RF output OFF period is longer than the initial delay time $T_{IDT}$, it is possible to surely avoid the interruption of communication in the active mode. Whether the bit 7 in the PPi field and the PPt field is allowed to be "1" or not is determined by the application, which can be executed by the CPU 21 (FIG. 4) or executed by a device incorporated in the NFC communication device.

Accordingly, the communication in the active mode is not interrupted even when the RF output OFF period is longer than the initial delay time $T_{IDT}$. That is, the RF output OFF period and the RF output ON period can be optionally determined between the initiator and the target.

Note that the initial delay time $T_{IDT}$ in the case in which the NFC communication device to be the initiator performs the initial RFCA processing again after the series of communication exchange (transaction) has completed can count the last RF output OFF period in the previous transaction as part of the initial delay time $T_{IDT}$.

In the above embodiment, the processing is started in the processing flow in the active mode of the NFCIP-1 at first and the communication mode is changed to the passive mode when the transition to the passive mode is agreed regardless whether the target communication mode is the active mode or the passive mode. There is an advantage in the processing flow that it is not necessary to change the processing flow of the passive mode. Therefore, when compatibility of communication processing in the passive mode is not given priority, it is preferable that the same processing flow as the processing shown in FIG. 9 is performed, and the commands PSL2_REQ and PSL2_RES are performed in addition to the commands PSL_REQ and PSL_RES in Step S19 and S20 to thereby execute the power saving mode.

Because it is unclear that the target can operate in the power saving mode until receiving the response PSL2_RES in the above embodiment, the communication complying with NFCIP-1 is performed, namely, the electromagnetic wave of 1.5 A/m or higher is outputted. However, for example, when the assumption is made that the communication is performed only with the target operating in the power saving mode according to the purpose of communication, in other words, when the communication may not be performed with the target which does not operate in the power saving mode, it is also preferable that the electromagnetic wave is outputted in the low RF output mode from the start (from the processing of Step S101).

Moreover, in the above embodiment, the RF output ON period and the RF output OFF period are determined by the initiator (determined value is transmitted to the target), however, it is also preferable that the RF output ON period and the RF output OFF period are determined by performing negotiation between the initiator and the target. For example, when the target desires to make the RF output ON period and the RF output OFF period longer (or shorter) than the value transmitted from the initiator, the target can transmits a desired value.

Also in the above embodiment, values to be the RF output ON period and the RF output OFF period are set in Byte4 and Byte5 fields, Byte6 and Byte7 fields respectively, and valid and invalid of the values are set in the bit 6 and the bit 5 of the FLAG field. Alternatively, valid and invalid can be set by values to be set in Byte4 and Byte5 fields, Byte6 and Byte7 fields. For example, when a value in the Byte4 and Byte5 fields, Byte6 and Byte7 fields is "FFFF" or "0000", it may be indicated that the intermittent output mode is invalid. It is also preferable that, output of the electromagnetic wave is made to be OFF when the transaction has completed, and the OFF state is kept until the device is activated again by the application. The low RF output OK bit and the passive OK bit can be also determined by performing negotiation between the initiator and the target.

The point of the embodiment of the invention is that information concerning whether the low RF mode or the intermittent RF output mode is possible or not can be exchanged between the initiator and the target and the communication is performed in the low RF mode or the intermittent RF output mode which is agreed between them. Therefore, the command or the parameter used when the presence of the low RF mode and the intermittent RF output mode functions as well as operation parameters are exchanged can be optionally selected.

[Verification of Power Saving Effect]

Next, the power saving effect by the power saving mode when the NFC communication device incorporated in a cell phone is operated as an initiator will be verified on the assumption that the above NFC communication device is incorporated as part of the cell phone.

Figure 24:
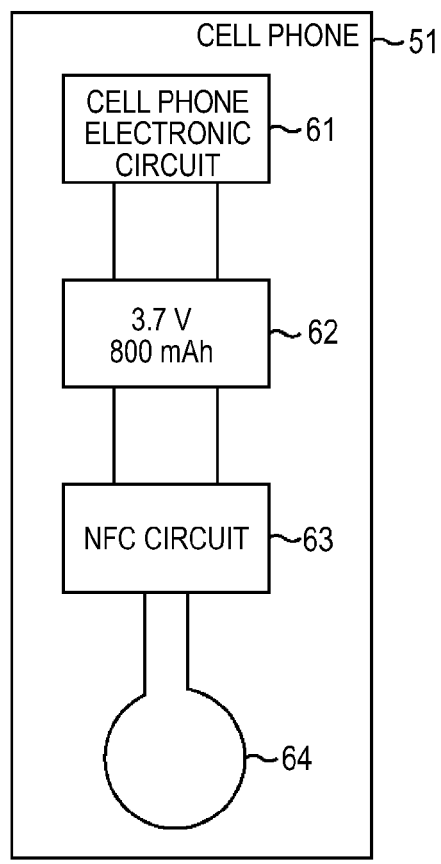
FIG. 24 is a block diagram showing a configuration example of a cell phone in which the NFC communication device is incorporated.

FIG. 24 is a block diagram showing a configuration example of a cell phone in which the NFC communication device is incorporated.

A cell phone 51 includes a cell phone electronic circuit 61, a battery 62, an NFC circuit 63 and an NFC antenna 64.

The cell phone electronic circuit 61 is an electromagnetic circuit which realizes an audio communication function of the cell phone 51. The battery 62 is formed by, for example, a lithium battery, supplying power to both the cell phone electronic circuit 61 and the NFC circuit 63. The battery 62 is commonly used for the cell phone, for example, having ability of approximately 800 [mAh] in a supply voltage of 3.7 [V].

The NFC circuit 63 and the NFC antenna 64 correspond to respective components of the NFC communication device 1 shown in FIG. 4. That is, the NFC circuit 63 corresponds to the receiving unit 12 to the control unit 21 and the NFC antenna 64 corresponds to the antenna 11. Since the power is supplied from the buttery 62, the power supply unit 22 in FIG. 4 is not included in the NFC circuit 63.

First, electric current flowing in the NFC antenna 64 when the NFC circuit 63 of the cell phone 51 performs operations as the initiator complying with NFCIP-1 is calculated.

The following relation holds between magnetic flux density B(Z) [μT] and the magnetic field strength H [A/m].

$$B(z) = \mu_0 \times H \quad (1)$$

Here, $\mu_0$ is a conversion constant, and $\mu_0 = 4\Pi 10^{-7}$ [T/A/m].

Figure 25:
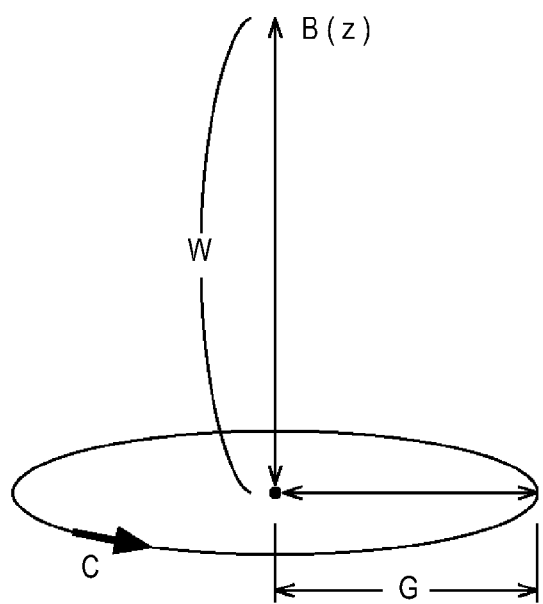
FIG. 25 is a view explaining a relation formula of magnetic flux density.

As shown in FIG. 25, when an electric current C [A] flows in a circular coil having a radius G[m], the magnetic flux density (a vertical component of the circular coil) B(Z) [μT] in a distance W[m] from the center of the circular coil can be represented by the following formula (2).

$$B(z) = \frac{\mu_0 C G^2}{2(W^2 + G^2)^{\frac{3}{2}}} \quad (2)$$

Accordingly, a formula (3) holds from the formula (1) and the formula (2).

$$\frac{\mu_0 C G^2}{2(W^2+G^2)^{\frac{3}{2}}} = \mu_0 \times H \quad (3)$$

After changing the formula (3) so that the left side is only "C", $\mu_0$ is cancelled to thereby obtain a formula (4).

$$C = \frac{H \times 2(W^2+G^2)^{\frac{3}{2}}}{G^2} \quad (4)$$

Accordingly, the electric current flowing in the NFC antenna 64 can be calculated by substituting conditions in which the NFC circuit 63 of the cell phone 51 performs operations as the initiator complying with NFCIP-1 into the formula (4).

NFCIP-1 prescribes that the electromagnetic wave is outputted in power within 1.5 [A/m] to 7.5 [A/m]. The initiator outputs the electromagnetic wave in power of 1.5 [A/m] which is the lower limit for allowing the duration of the battery 62 to be as long as possible. The operation range (proximity distance) is within 3 [cm] because of the limited mounting space in the cell phone. Assume that the NFC antenna 64 of the cell phone 51 is wound once in a circular manner (circular shape), and a radius of the circle is 1.5 [cm].

Accordingly, W=0.03 [m], G=0.015 [m], $\mu_0$=4Π10$^{-7}$ and H=1.5 [A/m] are substituted into the formula (4) respectively.

As a result, the following formula holds.

$$C = \frac{1.5 \times 2 \times (0.03^2 + 0.015^2)^{\frac{3}{2}}}{0.015^2}$$
$$\approx 0.5\ A$$

That is, when the cell phont 51 outputs the electromagnetic wave as the initiator, the NFC circuit 63 allows the electric current of 0.5 [A] to flow in the NFC antenna 64 by the NFC circuit 63 continuously, thereby assuring the magnetic field strength of 1.5 [A/m] at a position 3 [cm] apart from the NFC antenna 64.

Next, the duration of the battery 62 in the case that the electric current of 0.5 [A] (500 [mA]) is allowed to flow in the NFC antenna 64 continuously is calculated under a condition that the efficiency of the electronic circuit is 30%. In this case, 60×800/500=96 [min], 96×0.3=28.8 [min], as a result, the duration is 28.8 minutes.

Next, the duration in the case that the communication in the low RF output mode is performed is calculated under the same condition.

In the low RF output mode, the power of the electromagnetic wave is just 0.3 [A/m], therefore, H=0.3 [A/m], W=0.03 [m], G=0.015 [m] are substituted into the formula (4) to calculate an electric current C satisfying the magnetic field H=1.5 [A/m] at a position 3 cm apart from the center of the NFC antenna 64, as a result, 0.167 [A] can be obtained.

Then, when the duration is calculated under a condition that the efficiency of the electronic circuit is 30% in the same manner as the above, 60×800/167=287 [min], 287×0.3=86.2 [min], as a result, the duration will be 86.2 minutes.

According to the above, 86.2/28.8=2.99, therefore, it is possible to extend the duration of the battery 62 approximately threefold when operations as the initiator are performed in the low RF output mode. That is, the power consumption can be reduced by the low RF output mode.

In the intermittent RF output mode, the duration of the battery 62 can be extended in proportion to RF output OFF period to be secured. Therefore, it is possible to reduce power consumption also in the intermittent RF output mode.

In the above example, the explanation have been made by determining the lower limit value of power of the electromagnetic wave in the low RF output mode is 0.3 [A/m], however, it is not always necessary that the lower limit value is 0.3 [A/m]. For example, the lower limit value may be 0.15 [A/m] prescribed in ISO/IEC 15693 and the like, or other values may also be used.

In the embodiment, steps described in the flowcharts includes not only processing executed along the described order in time series but also processing executed in parallel or individually, though not always processed in time series.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication device comprising:
an electromagnetic-wave generating means for outputting an electromagnetic wave; and
a transmitting/receiving means for transmitting data by modulating the electromagnetic wave in accordance with data as well as receiving data transmitted from the other device by demodulating the electromagnetic wave outputted by the electromagnetic-wave generating means or the electromagnetic wave outputted by the other device as the other party of communication,
wherein the transmitting/receiving means transmits attribute information indicating communication ability of the device itself as well as receives attribute information indicating communication ability of the other device as the data, and
the electromagnetic-wave generating means turns off the output of the electromagnetic wave for a given period of time after the transmission of the data based on the attribute information.

2. The communication device according to claim 1,
wherein, in an active mode in which data is transmitted by modulating the electromagnetic wave in accordance with data as well as data transmitted from the other device is received by demodulating the electromagnetic wave outputted by the other device, the electromagnetic-wave generating means turns off output of the electromagnetic wave for a given period of time shorter than an initial delay time which is the minimum time for which a device which intends to start transmission/reception of data have to check that the electromagnetic wave is not output.

3. The communication device according to claim 1,
wherein, in an active mode in which data is transmitted by modulating the electromagnetic wave in accordance with data as well as data transmitted from the other device is received by demodulating the electromagnetic wave outputted by the other device, the attribute information transmitted and received by the transmitting/receiving means includes information concerning the given period of time for which output of the electromagnetic wave is turned off, and the electromagnetic-wave generating means turns off output of the electromagnetic wave for the given time determined by the attribute information.

4. The communication device according to claim 3, wherein, when the given period of time is longer than the initial delay time which is the minimum time for which a device which intends to start transmission/reception of data have to check that the electromagnetic wave is not output, the communication device does not respond to output of the electromagnetic wave from another device which intends to start transmission/reception of data until the communication mode in which output of the electromagnetic wave is turned off during the given period of time is released.

5. A communication method for a communication device including an electromagnetic-wave generating means for outputting an electromagnetic wave and a transmitting/receiving means for transmitting data by modulating the electromagnetic wave in accordance with data as well as receiving data transmitted from another device by demodulating the electromagnetic wave outputted by the electromagnetic-wave generating means or the electromagnetic wave outputted by the other device as the other party of communication, the method comprising:

transmitting attribute information indicating communication ability of the device as well as receiving attribute information indicating communication ability of the other device as the data by the transmitting/receiving means; and turning off output of the electromagnetic wave for a given period of time after transmission of the data based on the attribute information by the electromagnetic-wave generating means.

6. A non-transitory computer readable medium storing a computer program that when executed by a processor causes a computer to:

transmit attribute information indicating communication ability of a device as well as receiving attribute information indicating communication ability of another device as data by the transmitting/receiving means for transmitting data by modulating the electromagnetic wave in accordance with data as well as receiving data transmitted from the other device by demodulating the electromagnetic wave outputted by the electromagnetic-wave generating means or the electromagnetic wave outputted by the other device as the other party of communication, and turn off output of the electromagnetic wave for a given period of time after transmission of the data based on the attribute information by the electromagnetic-wave generating means.

7. A communication system comprising:
a first communication device; and
a second communication device which is the other party of communication,
wherein the first communication device includes
an electromagnetic-wave generating means for outputting an electromagnetic wave, and
a first transmitting/receiving means for transmitting data by modulating the electromagnetic wave in accordance with data as well as receiving data transmitted from the second communication device by demodulating the electromagnetic wave outputted by the electromagnetic-wave generating means or the electromagnetic wave outputted by the second communication device,
the first transmitting/receiving means transmits attribute information indicating communication ability of the first communication device as well as receives attribute information indicating communication ability of the second communication device as data,
the electromagnetic-wave generating means turns off output of the electromagnetic wave for a given period of time after transmission of the data based on the attribute information,
the second communication device includes
a second transmitting/receiving means for receiving data transmitted from the first communication device by demodulating the electromagnetic wave outputted by the first communication device as well as transmitting data by modulating the electromagnetic wave outputted by the first communication device or the electromagnetic wave outputted by the device for itself in accordance with the data, and
the second transmitting/receiving means receives attribute information indicating communication ability of the first communication device as well as transmits attribute information indicating communication ability of the second communication device as data.

8. A communication device comprising:
an electromagnetic-wave generating unit configured to output an electromagnetic wave; and
a transmitting/receiving unit configured to transmit data by modulating the electromagnetic wave in accordance with data as well as receive data transmitted from another device by demodulating the electromagnetic wave outputted by the electromagnetic-wave generating unit or the electromagnetic wave outputted by the other device as the other party of communication,
wherein the transmitting/receiving unit transmits attribute information indicating communication ability of the communication device as well as receives attribute information indicating communication ability of the other device as the data, and
the electromagnetic-wave generating unit turns off the output of the electromagnetic wave for a given period of time after the transmission of the data based on the attribute information.

9. A communication system comprising:
a first communication device; and
a second communication device which is the other party of communication,
wherein the first communication device includes
an electromagnetic-wave generating unit configured to output an electromagnetic wave, and
a first transmitting/receiving unit configured to transmit data by modulating the electromagnetic wave in accordance with data as well as receive data transmitted from the second communication device by demodulating the electromagnetic wave outputted by the electromagnetic-wave generating unit or the electromagnetic wave outputted by the second communication device,
the first transmitting/receiving unit transmits attribute information indicating communication ability of the first communication device as well as receives attribute information indicating communication ability of the second communication device as data,
the electromagnetic-wave generating unit turns off output of the electromagnetic wave for a given period of time after transmission of the data based on the attribute information,
the second communication device includes
a second transmitting/receiving unit configured to receive data transmitted from the first communication device by demodulating the electromagnetic wave outputted by the first communication device as well as transmit data by modulating the electromagnetic wave outputted by the first communication device or the electromagnetic wave outputted by the device for itself in accordance with the data, and the second transmitting/receiving unit receives attribute information indicating communication ability of the first communication device as well as transmits attribute information indicating communication ability of the second communication device as data.

* * * * *